(12) United States Patent
Aoi et al.

(10) Patent No.: US 7,916,405 B2
(45) Date of Patent: Mar. 29, 2011

(54) IMAGING LENS UNIT, IMAGING DEVICE, AND PORTABLE TERMINAL

(75) Inventors: Yuma Aoi, Hirakata (JP); Youhei Nakagawa, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 139 days.

(21) Appl. No.: 12/181,716

(22) Filed: Jul. 29, 2008

(65) Prior Publication Data

US 2009/0034098 A1 Feb. 5, 2009

(30) Foreign Application Priority Data

Jul. 30, 2007 (JP) ................................ 2007-198179
Jul. 30, 2007 (JP) ................................ 2007-198180

(51) Int. Cl.
*G02B 9/12* (2006.01)
*G02B 13/18* (2006.01)
(52) U.S. Cl. ........................................ 359/784; 359/716
(58) Field of Classification Search .................. 359/784, 359/785, 789, 791, 792, 715, 716
See application file for complete search history.

(56) References Cited

U.S. PATENT DOCUMENTS

| 6,744,570 | B1 * | 6/2004 | Isono ........................... 359/772 |
| 7,031,079 | B2 * | 4/2006 | Isono ........................... 359/791 |
| 7,251,083 | B2 | 7/2007 | Kubota et al. |
| 7,304,807 | B2 * | 12/2007 | Isono ........................... 359/716 |
| 7,388,721 | B2 | 6/2008 | Kubota et al. |
| 7,400,454 | B2 | 7/2008 | Kubota et al. |
| 7,420,609 | B2 * | 9/2008 | Yamaguchi et al. .......... 348/335 |
| 7,474,479 | B2 * | 1/2009 | Isono ........................... 359/779 |
| 7,595,939 | B2 * | 9/2009 | Sato et al. ..................... 359/785 |
| 2007/0195432 | A1 * | 8/2007 | Nakamura ..................... 359/784 |
| 2007/0229986 | A1 * | 10/2007 | Sato et al. ..................... 359/784 |
| 2008/0100926 | A1 * | 5/2008 | Chen et al. .................... 359/717 |

FOREIGN PATENT DOCUMENTS

| JP | 2006-301403 | 2/2006 |
| JP | 2006-154767 | 6/2006 |

* cited by examiner

*Primary Examiner* — Jordan M. Schwartz
(74) *Attorney, Agent, or Firm* — Occhiuti Rohlicek & Tsao LLP

(57) ABSTRACT

An imaging lens unit which achieves a lower profile without adversely affecting the optical performance. The imaging lens unit includes a first lens, an aperture stop, a second lens, and a third lens arranged sequentially along the optical axis from the object side to the image side. The first lens includes a first surface located on the object side and being convex toward the object side and a second surface located on the image side and being concave toward the image side near the optical axis and convex toward the image side as the rim of the first lens becomes closer.

5 Claims, 23 Drawing Sheets

Fig.2
(a)
(b)
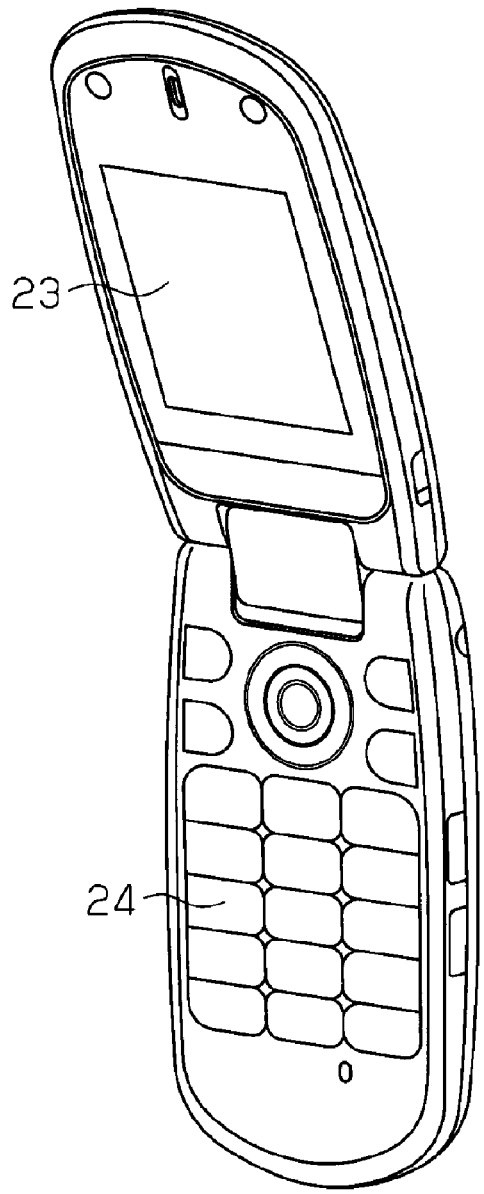
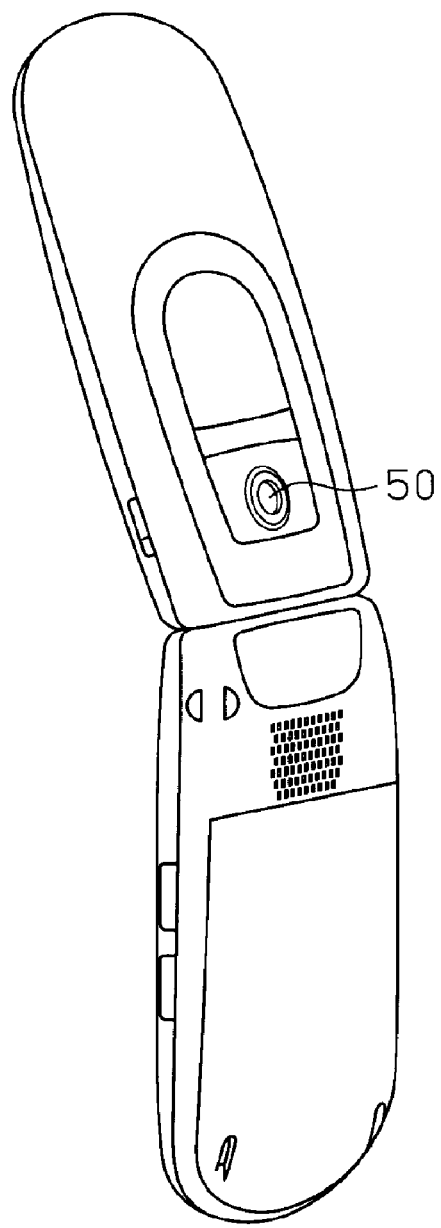

Fig.5
(a)
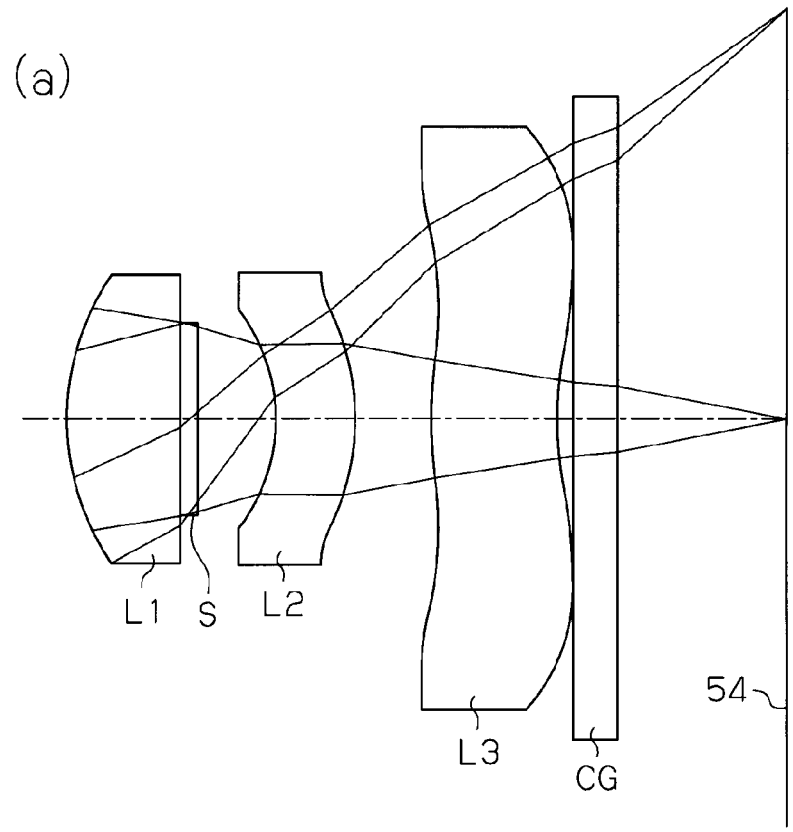
(b)
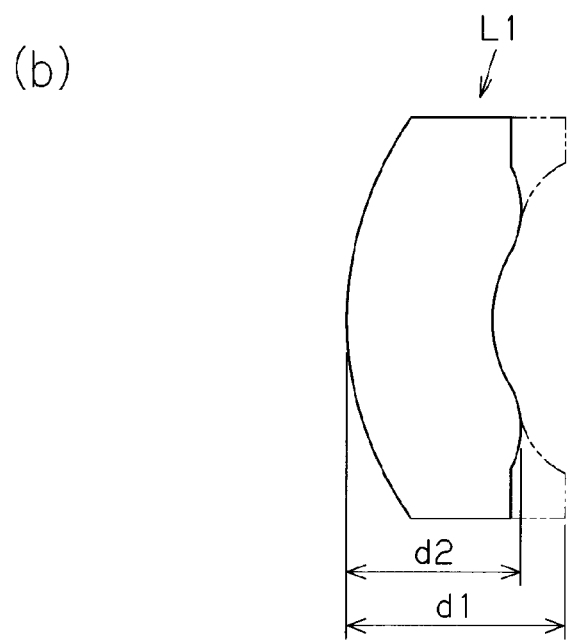
Object Side ←——————→ Image Side

Fig.6
(a)
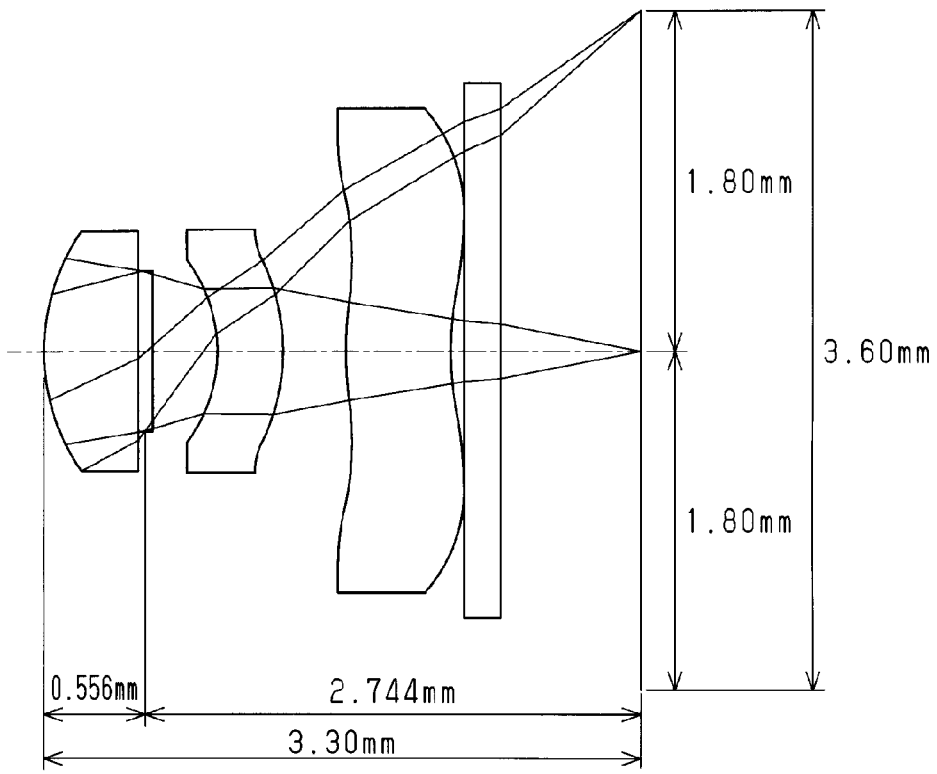
(b)
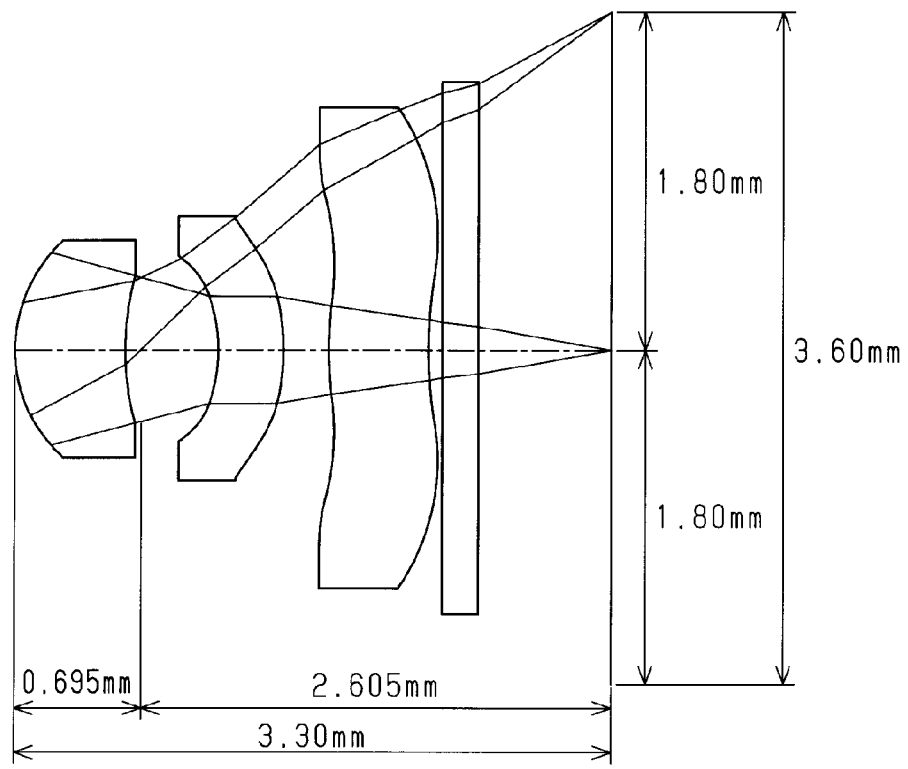

Fig.7
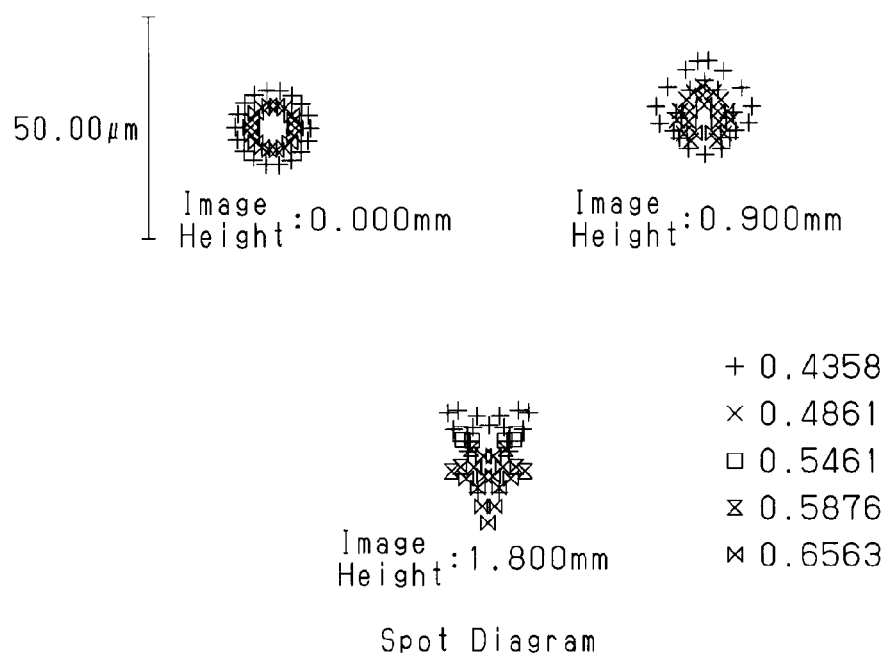
(a)
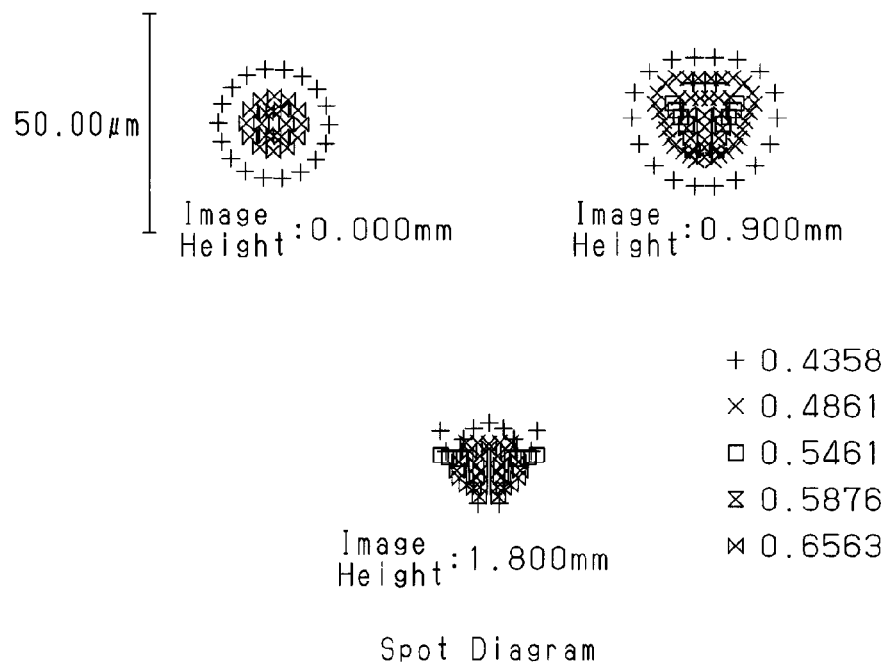
(b)

Fig.8
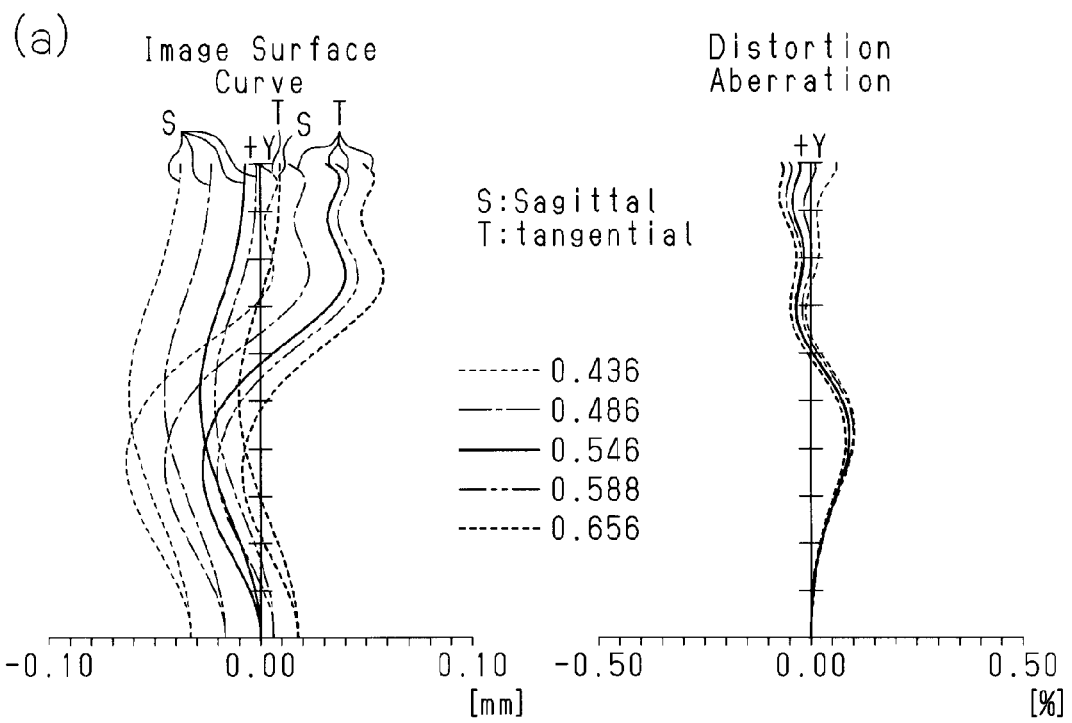
(a)
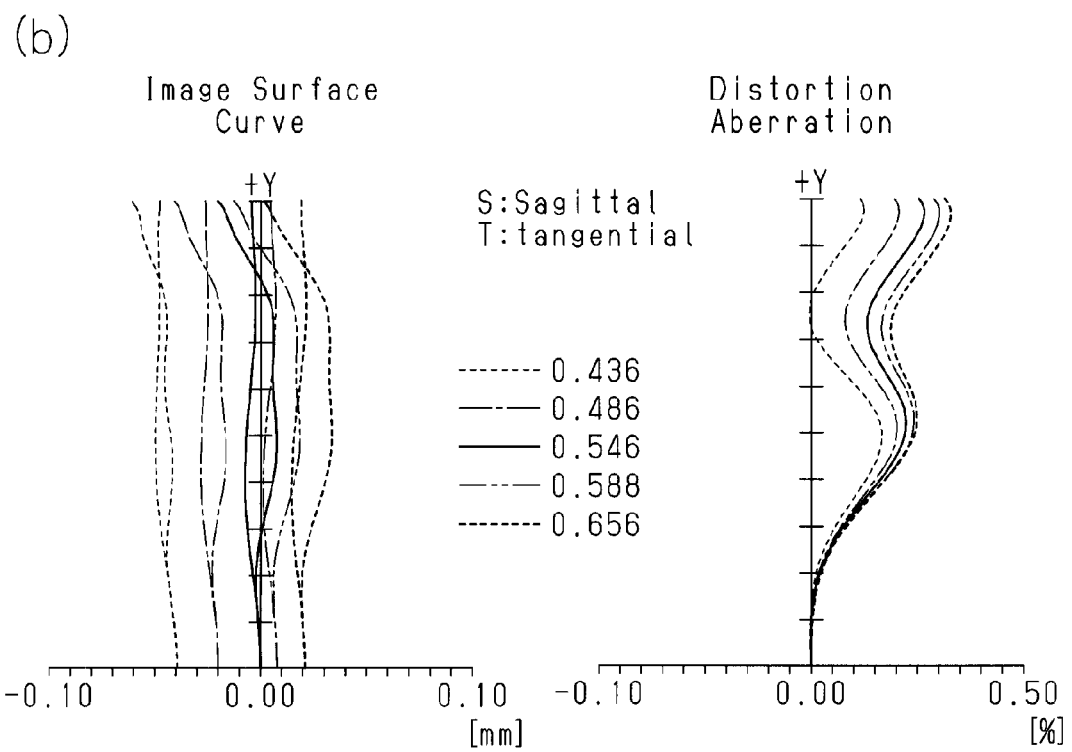
(b)

Fig.9
(a)
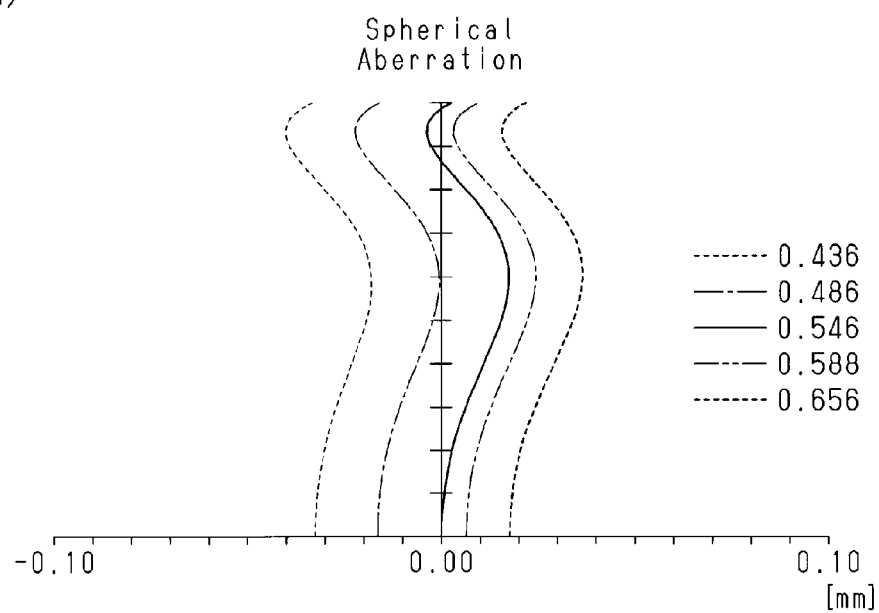
(b)
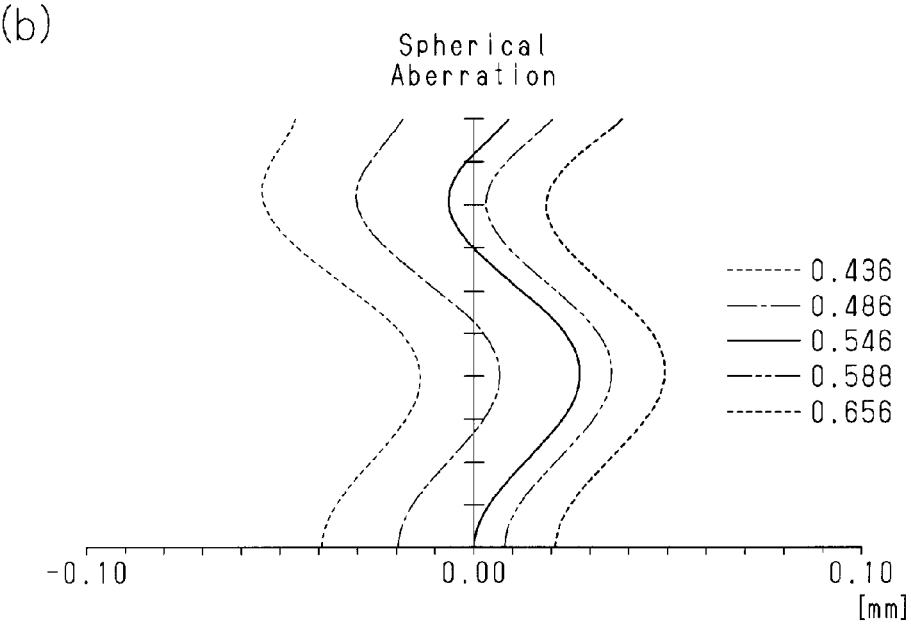

Fig.10
(a)
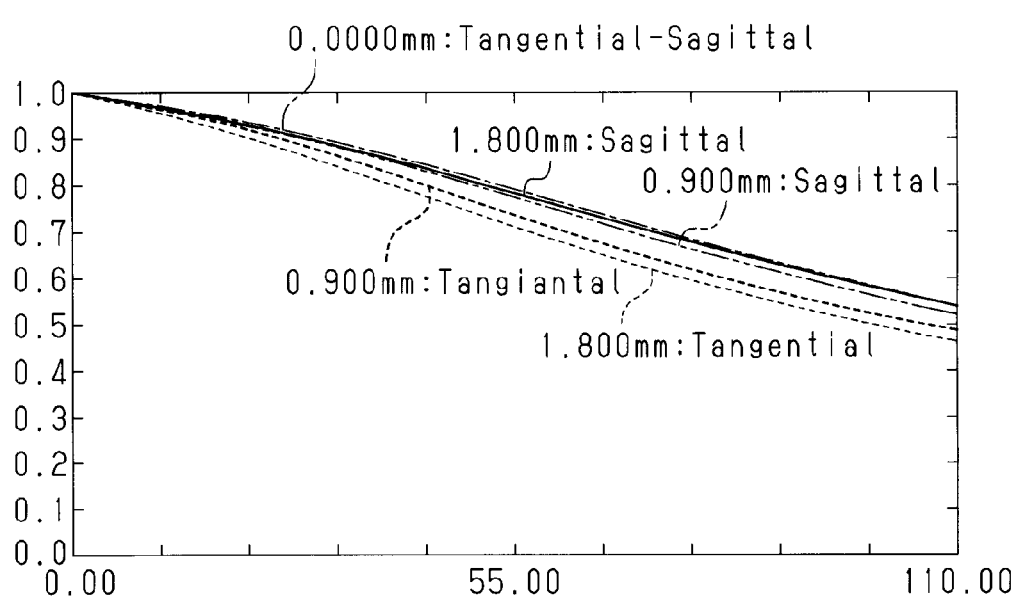
(b)
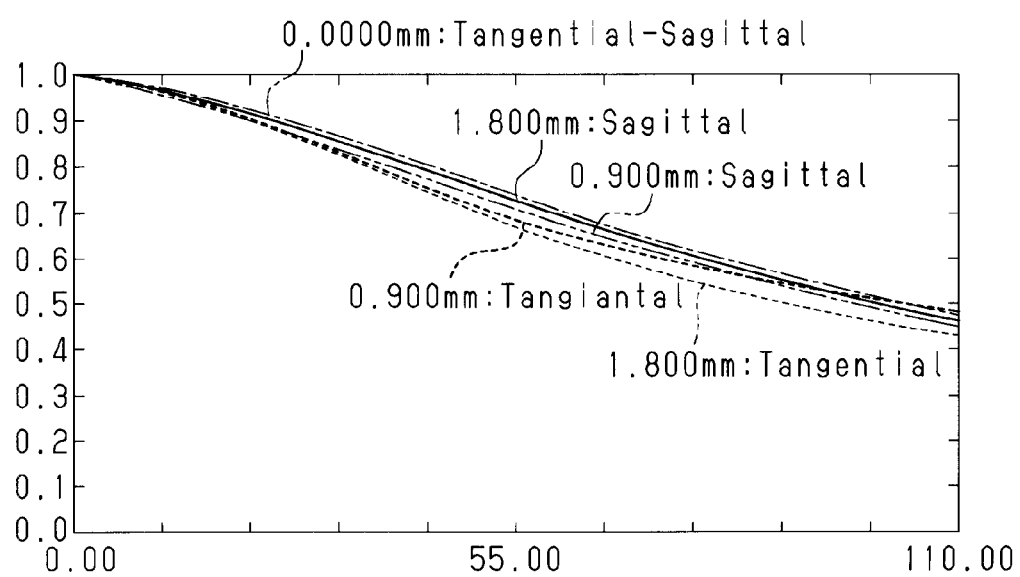

Fig.15
(a)
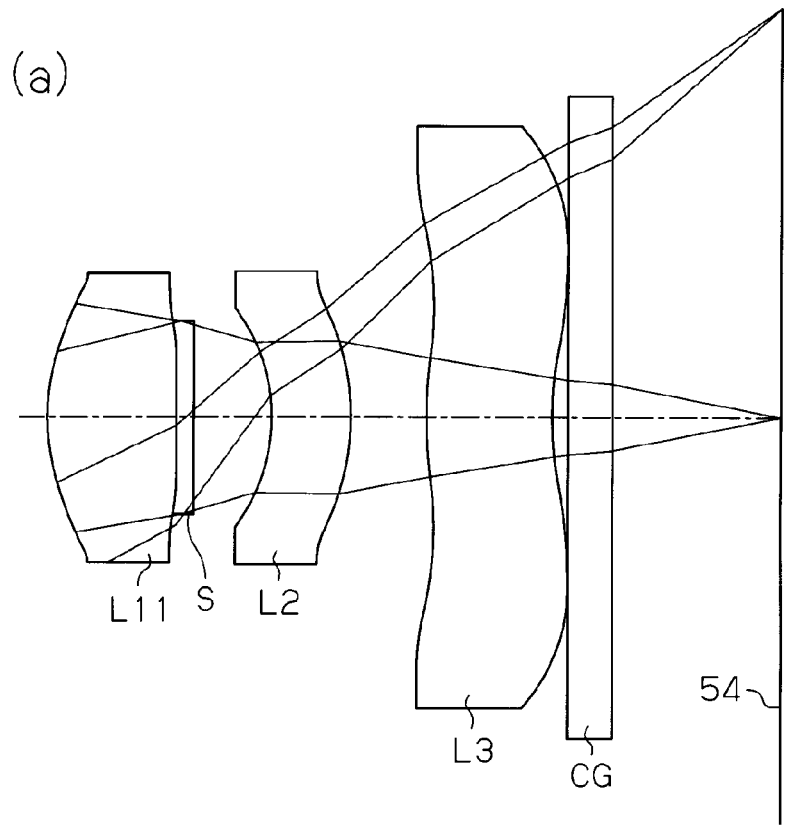
L11　S　L2
L3　CG　54
(b)
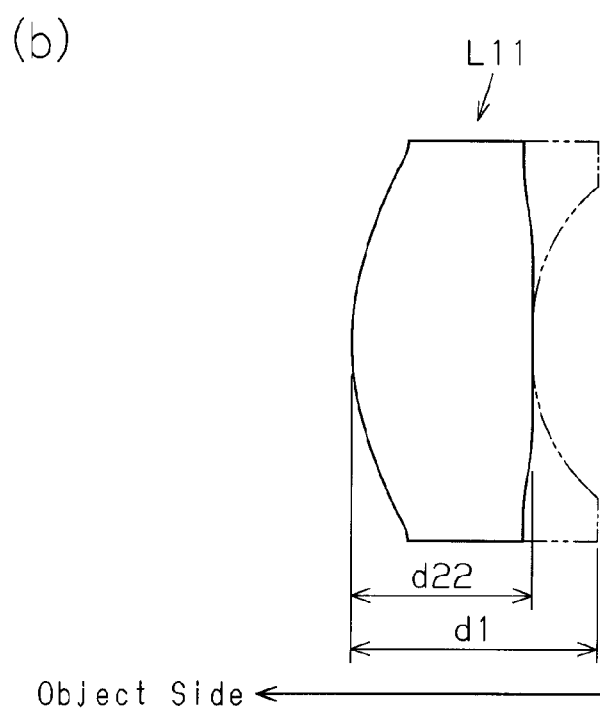
L11
d22
d1
Object Side ←——————→ Image Side

Fig.16
(a)
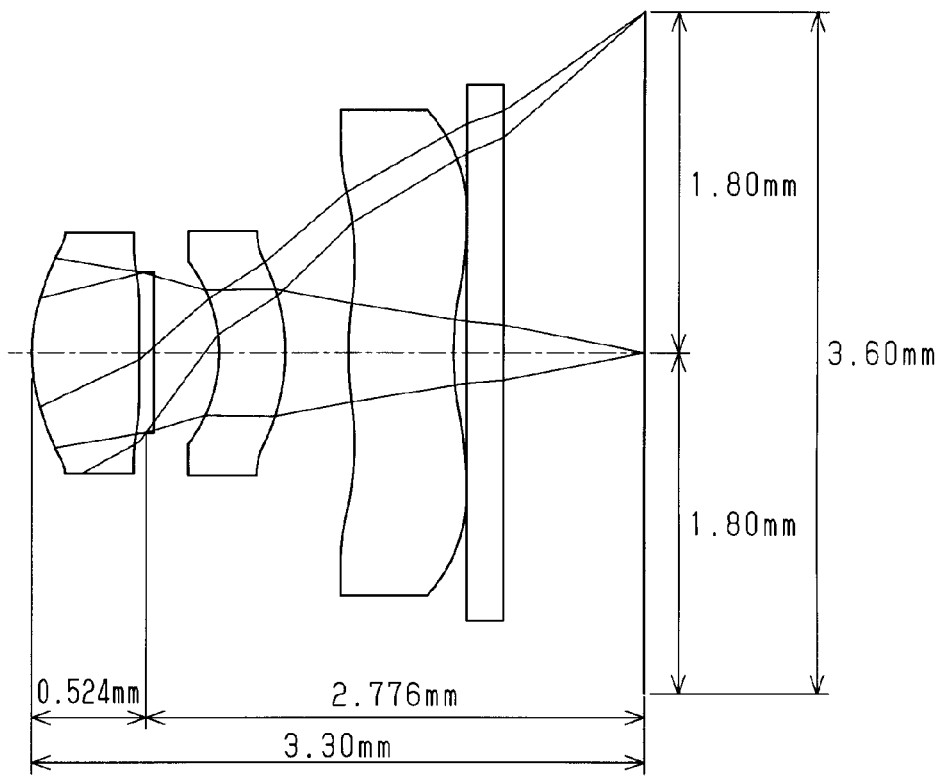
(b)
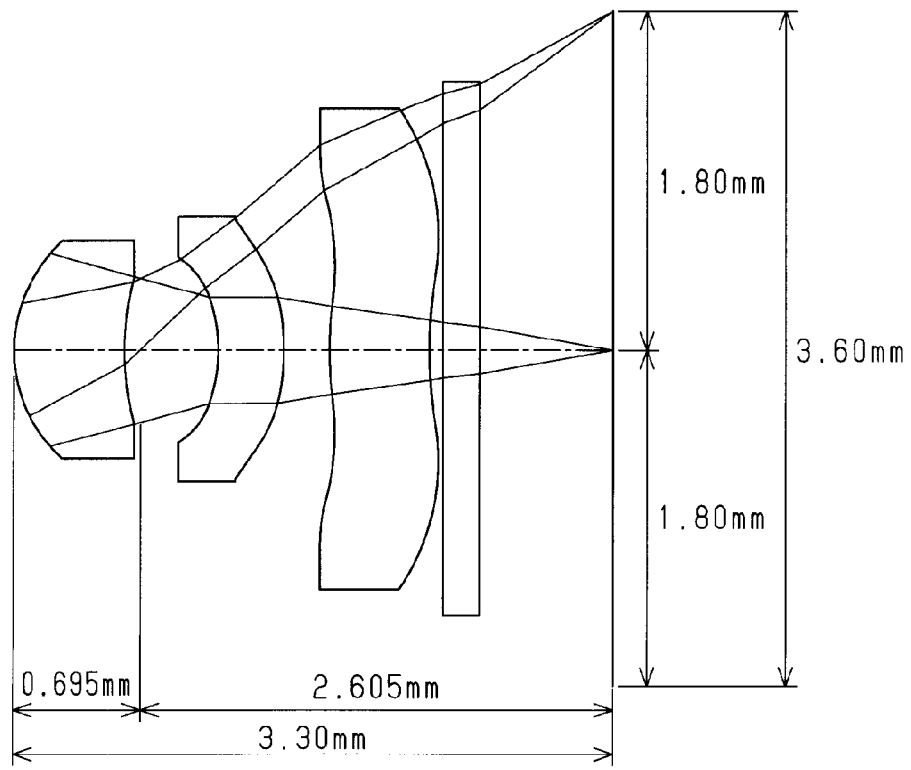

Fig.17
(a)
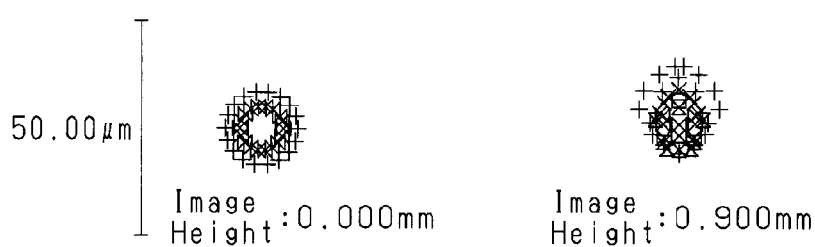
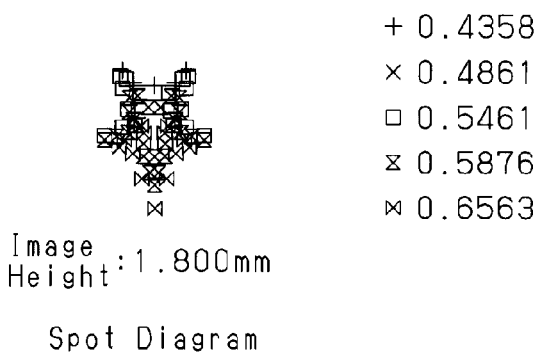
Spot Diagram
(b)
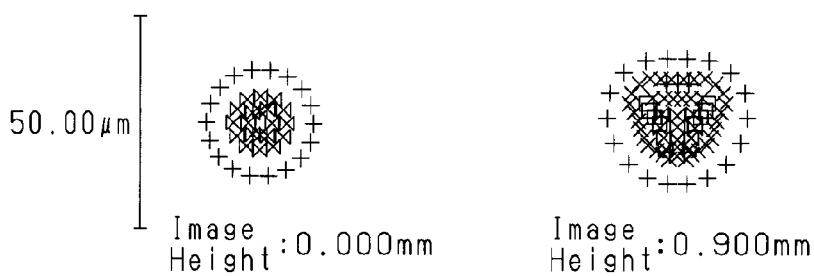
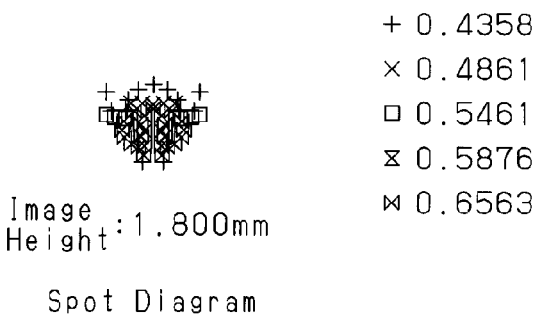
Spot Diagram

Fig.18
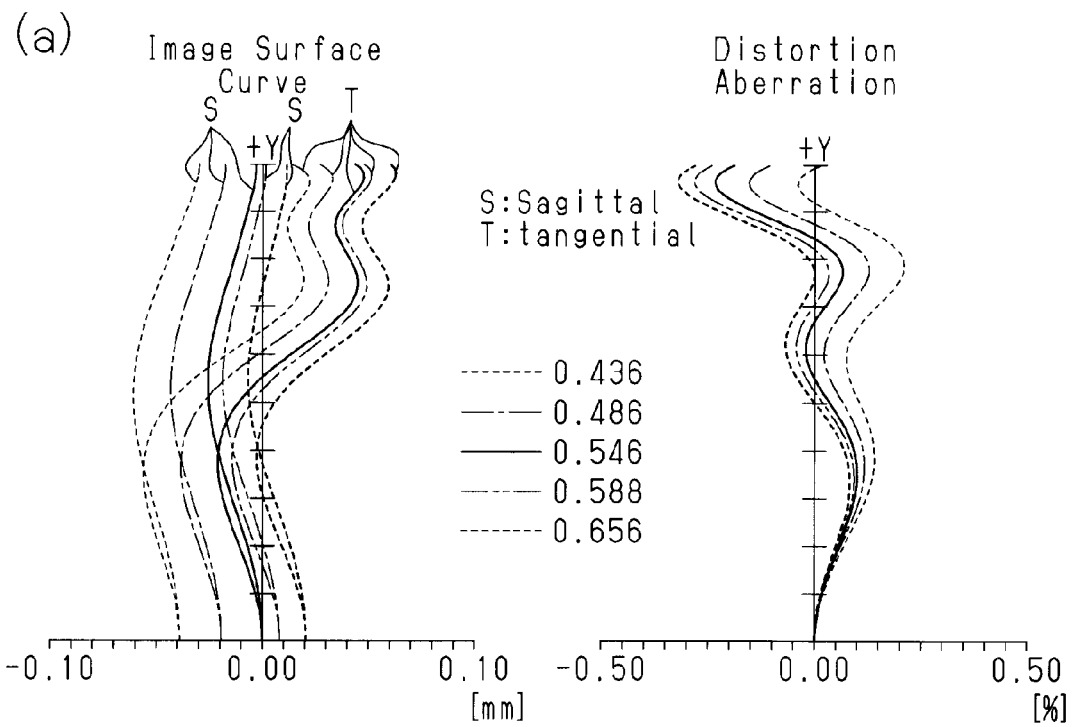
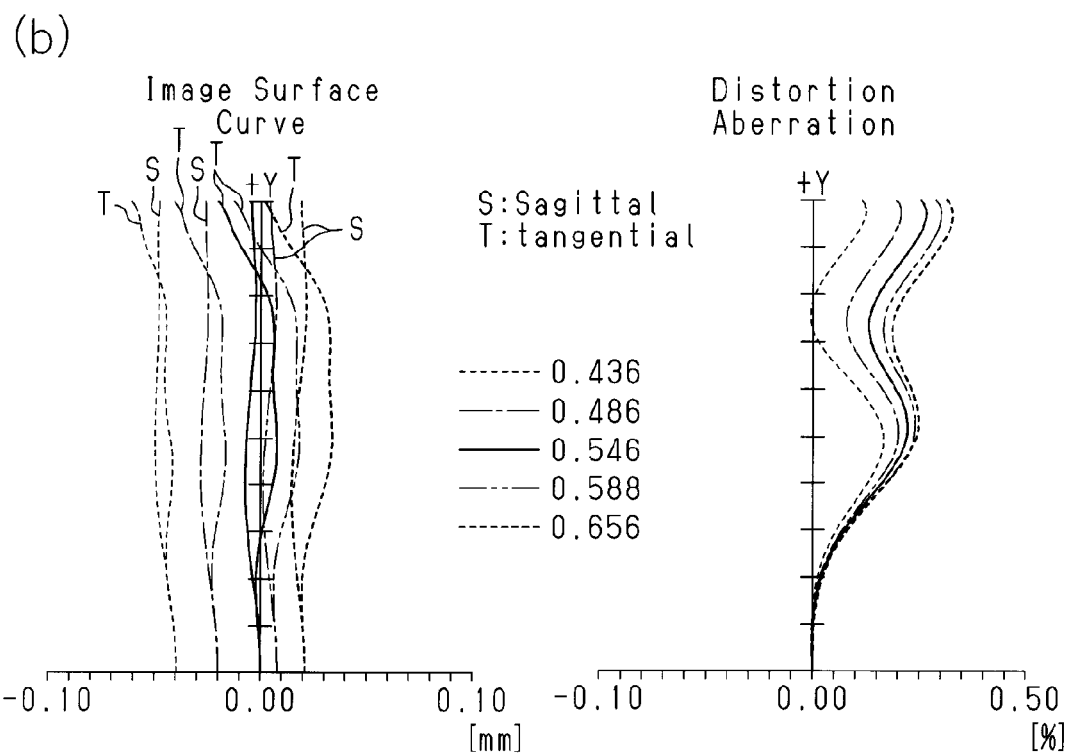

Fig.19
(a)
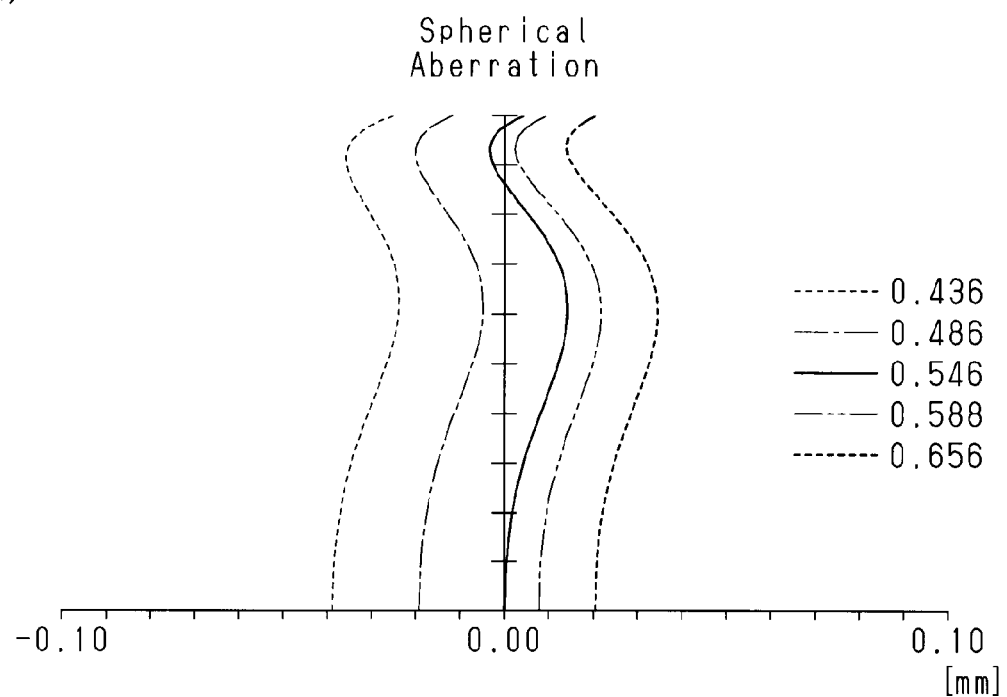
(b)
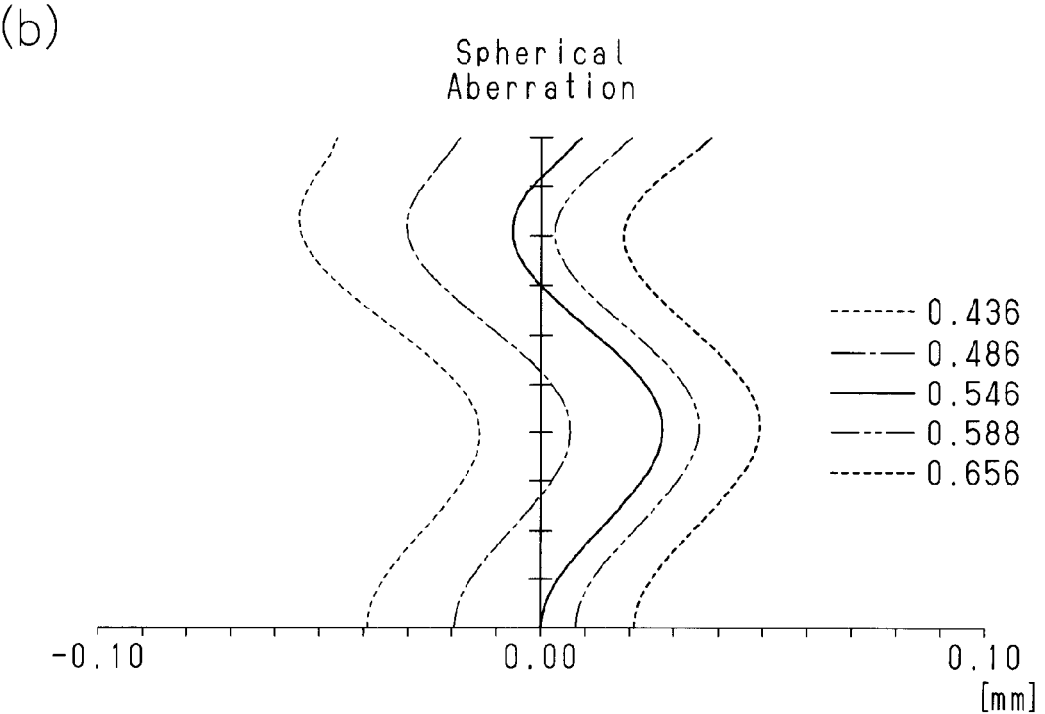

Fig.20
(a)
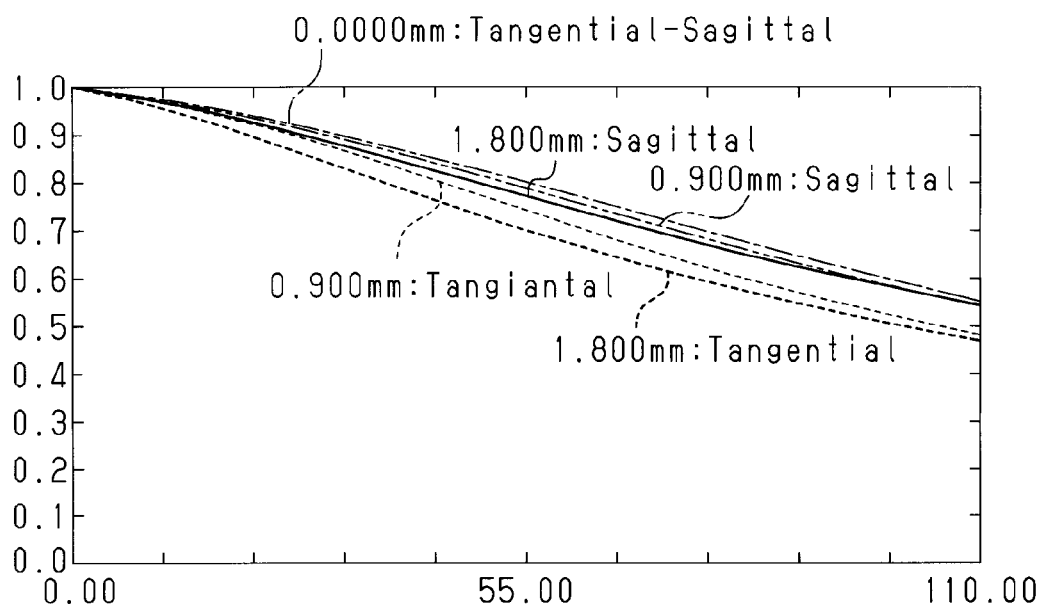
(b)
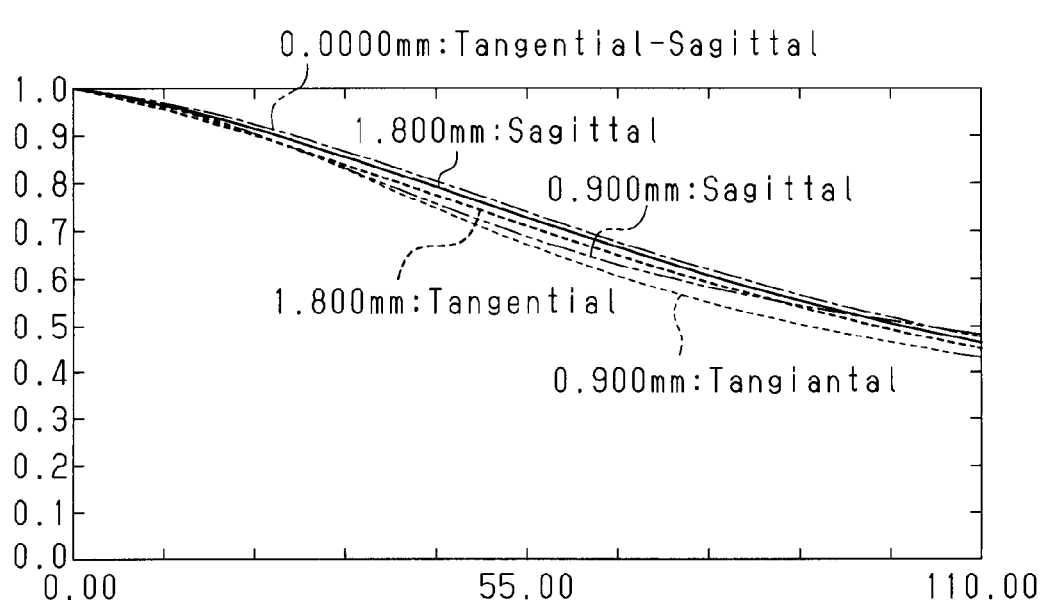

IMAGING LENS UNIT, IMAGING DEVICE, AND PORTABLE TERMINAL

CROSS-REFERENCE TO RELATED APPLICATIONS

This application is based upon and claims the benefit of priority from the prior Japanese Patent Applications No. 2007-198179, filed on Jul. 30, 2007, and No. 2007-198180, filed on Jul. 30, 2007, the entire contents of which are incorporated herein by reference.

BACKGROUND OF THE INVENTION

The present invention relates to an imaging lens unit, and more particularly, to an imaging lens unit installed in a compact imaging device. The invention further relates to an imaging device and portable terminal.

The demand for smaller imaging lens units has increased as imaging devices have become more compact. Imaging devices are now often installed in portable terminals. Thus, and increasingly low profiles and greater compactness in the optical axis direction are sought to conform to the thickness of portable terminals. Although reduction in the number of lenses forming an imaging lens unit is effective for achieving a lower profile, optical characteristics would become inadequate since proper aberration correction is difficult in configurations of just one or two lenses. There is thus a demand for technology which can provide a lower profile without adversely affecting the optical characteristics. For example, Japanese Laid-Open Patent Publication Nos. 2006-154767 and 2006-301403 disclose imaging lens units that have tri-lens configurations which use meniscus-shaped lenses for the first and second lenses as viewed from the object side.

In order to correct aberration with a limited number of lenses, each lens configuring the imaging lens unit desirably uses an aspherical lens that is unlikely to produce aberration. An aspherical lens is difficult to manufacture when using glass and is thus manufactured by injection molding normal plastic. To ensure the required strength, there are restrictions on the lens thickness when performing injection molding. Thus, extremely thin plastic lenses cannot be manufactured.

However, there are growing demands for low profile imaging devices which can be installed in increasingly thinner portable terminals. Although each lens in an imaging lens unit must be further reduced in size to cope with these demands and realize even lower profiles using the art techniques described in the above publications, there are limits to manufacturing thinner plastic lenses as described above.

SUMMARY OF THE INVENTION

The present invention provides an imaging lens unit that has a lower profile without adversely affecting the optical characteristics.

A first aspect of the present invention is an imaging lens unit including a first lens, an aperture stop, a second lens, and a third lens arranged sequentially along an optical axis from an object side toward an image side. The first lens includes a first surface located on the object side and being convex toward the object side and a second surface located on the image side and being concave toward the image side near the optical axis and convex toward the image side as the first lens rim becomes closer. The second lens is meniscus in shape and includes a first surface located on the object side and a second surface located on the image side and being convex toward the image side. The third lens includes a first surface located on the object side and being convex toward the object side near the optical axis and concave toward the object side as the third lens rim becomes closer and a second surface located on the image side and being concave toward the image side near the optical axis and convex toward the image side as the third lens rim becomes closer.

A second aspect of the present invention is an imaging lens unit including a first lens, an aperture stop, a second lens, and a third lens arranged sequentially along an optical axis from an object side toward an image side. The first lens includes a first surface located on the object side and being convex toward the object side and a second surface located on the image side and being convex toward the image side. The second lens is meniscus in shape and includes a first surface located on the object side and a second surface located on the image side and being convex toward the image side. The third lens includes a first surface located on the object side and being convex toward the object side near the optical axis and concave toward the object side as the third lens rim becomes closer and a second surface located on the image side and being concave toward the image side near the optical axis and convex toward the image side as the third lens rim becomes closer.

A third aspect of the present invention is an imaging device including an imaging lens unit and an imaging element. The imaging lens unit includes a first lens, an aperture stop, a second lens, and a third lens arranged sequentially along an optical axis from an object side toward an image side. The imaging element converts an optical image formed by the imaging lens unit to an electrical signal. The first lens includes a first surface located on the object side and being convex toward the object side and a second surface located on the image side and being concave toward the image side near the optical axis and convex toward the image side as the first lens rim becomes closer. The second lens is meniscus in shape and includes a first surface located on the object side and a second surface located on the image side and being convex toward the image side. The third lens includes a first surface located on the object side and being convex toward the object side near the optical axis and concave toward the object side as the third lens rim becomes closer and a second surface located on the image side and being concave toward the image side near the optical axis and convex toward the image side as the third lens rim becomes closer.

A fourth aspect of the present invention is a portable terminal including an imaging device, which includes an imaging lens unit and an imaging element. The imaging lens unit includes a first lens, an aperture stop, a second lens, and a third lens arranged sequentially along an optical axis from an object side toward an image side. The imaging element converts an optical image formed by the imaging lens unit to an electrical signal. The first lens includes a first surface located on the object side and being convex toward the object side and a second surface located on the image side and being concave toward the image side near the optical axis and convex toward the image side as the first lens rim becomes closer. The second lens is meniscus in shape and includes a first surface located on the object side and a second surface located on the image side and being convex toward the image side. The third lens includes a first surface located on the object side and being convex toward the object side near the optical axis and concave toward the object side as the third lens rim becomes closer and a second surface located on the image side and being concave toward the image side near the optical axis and convex toward the image side as the third lens rim becomes closer.

A fifth aspect of the present invention is an imaging device including an imaging lens unit and an imaging element. The imaging lens unit includes a first lens, an aperture stop, a second lens, and a third lens arranged sequentially along an optical axis from an object side toward an image side. The imaging element converts an optical image formed by the imaging lens unit to an electrical signal. The first lens includes first surface located on the object side and being convex toward the object side and a second surface located on the image side and being convex toward the image side. The second lens is meniscus in shape and includes a first surface located on the object side and a second surface located on the image side and being convex toward the image side. The third lens includes a first surface located on the object side and being convex toward the object side near the optical axis and concave toward the object side as the third lens rim becomes closer and a second surface located on the image side and being concave toward the image side near the optical axis and convex toward the image side as the third lens rim becomes closer.

A sixth aspect of the present invention is a portable terminal including an imaging device, which includes an imaging lens unit and an imaging element. The imaging lens unit includes a first lens, an aperture stop, a second lens, and a third lens arranged sequentially along an optical axis from an object side toward an image side. The imaging element converts an optical image formed by the imaging lens unit to an electrical signal. The first lens includes a first surface located on the object side and being convex toward the object side and a second surface located on the image side and being convex toward the image side. The second lens is meniscus in shape and includes a first surface located on the object side and a second surface located on the image side and being convex toward the image side. The third lens includes a first surface located on the object side and being convex toward the object side near the optical axis and concave toward the object side as the third lens rim becomes closer and a second surface located on the image side and being concave toward the image side near the optical axis and convex toward the image side as the third lens rim becomes closer.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 2 is an external view showing a portable terminal when in use, FIG. 2(a) is a front perspective view and FIG. 2(b) is a rear perspective view;

FIG. 5(a) is a schematic cross-sectional view of the imaging device of FIG. 4, and FIG. 5(b) is an enlarged view showing the first lens of FIG. 5(a) in detail;

FIG. 6 shows diagrams illustrating the effect of an imaging lens unit in example 1, FIG. 6(a) is a cross-sectional view showing the imaging lens unit of example 1, and FIG. 6(b) is a cross-sectional view showing the imaging lens unit of comparative example 1;

FIG. 7 shows diagrams illustrating the effect of the imaging lens unit of example 1, FIG. 7(a) is a spot diagram of the imaging lens unit of example 1, and FIG. 7(b) is a spot diagram of the imaging lens unit of comparative example 1;

FIG. 8 shows diagrams illustrating the effect of the imaging lens unit of example 1, FIG. 8(a) shows the curvature of field and the distortion of the imaging lens unit of example 1, and FIG. 8(b) shows the curvature of field and the distortion of the imaging lens unit of comparative example 1;

FIG. 9 shows diagrams illustrating the effect of the imaging lens unit of example 1, FIG. 9(a) shows the spherical aberration of the imaging lens unit of example 1, and FIG. 9(b) shows the spherical aberration of the imaging lens unit of comparative example 1;

FIG. 10 shows diagrams illustrating the effect of the imaging lens unit of example 1, FIG. 10(a) is a graph of the transfer function for the imaging lens unit of example 1, and 10(b) is a graph for the transfer function of the imaging lens unit of comparative example 1;

FIG. 15(a) is a schematic cross-sectional view of the imaging device of FIG. 14, and FIG. 15(b) is an enlarged view showing the first lens of FIG. 15(a) in detail;

FIG. 16 shows diagrams illustrating the effect of the imaging lens unit of example 2, FIG. 16(a) is a cross-sectional view of the imaging lens unit of example 2, and FIG. 16(b) is a cross-sectional view of the imaging lens unit of comparative example 1;

FIG. 17 shows diagrams illustrating the effect of the imaging lens unit of example 2, FIG. 17(a) is a spot diagram of the imaging lens unit of example 2, and FIG. 17(b) is a spot diagram of the imaging lens unit of comparative example 1;

FIG. 18 shows diagrams illustrating the effect of the imaging lens unit of example 2, FIG. 18(a) shows the curvature of field and the distortion of the imaging lens unit of example 2, and FIG. 18(b) shows the curvature of field and the distortion of the imaging lens unit of comparative example 1;

FIG. 19 shows diagrams illustrating the effect of the imaging lens unit of example 2, FIG. 19(a) shows the spherical aberration of the imaging lens unit of example 2, and FIG. 19(b) shows the spherical aberration of the imaging lens unit of comparative example 1;

FIG. 20 shows diagrams illustrating the effect of the imaging lens unit of example 2, FIG. 20(a) is a graph of the transfer function for the imaging lens unit of example 2, and FIG. 20(b) is a graph for the transfer function of the imaging lens unit of comparative example 1;

DETAILED DESCRIPTION OF THE PREFERRED EMBODIMENTS

Figure 1:
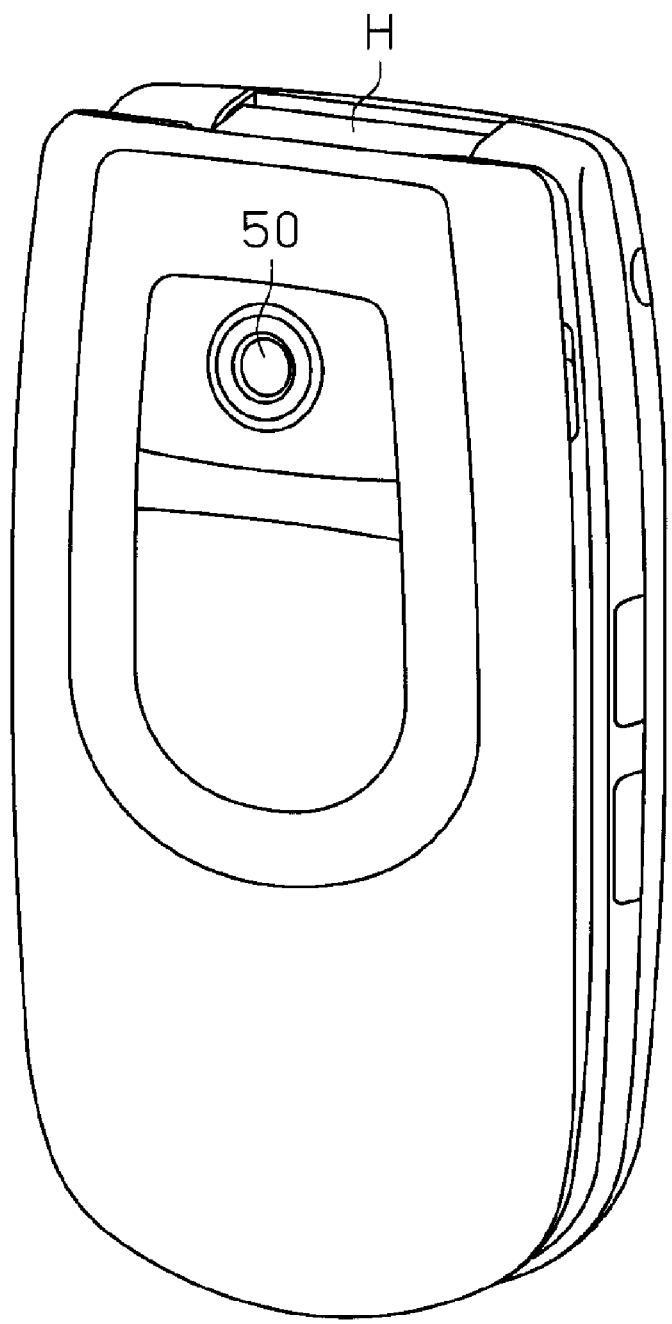
FIG. 1 is an external view showing a portable terminal when not in use.

In the drawings, like numerals are used for like elements throughout.

A portable terminal according to a first embodiment of the present invention will now be discussed with reference to FIGS. 1 through 13.

As shown in FIG. 1, the portable terminal of the first embodiment is a telephone which has a folding structure that folds about a hinge H. FIG. 1 shows the portable terminal in a folded, or closed state. An imaging device 50 is arranged in the outer front surface of the portable terminal. FIG. 2(a) shows the portable terminal in an open state. A display 23 and an operation panel 24 are arranged on inner surfaces of the portable terminal. FIG. 2(b) is a rear showing the portable terminal in an open state. In this state, the image of- an object is captured by facing the imaging device 50 toward the object and operating a shutter button.

Figure 3:
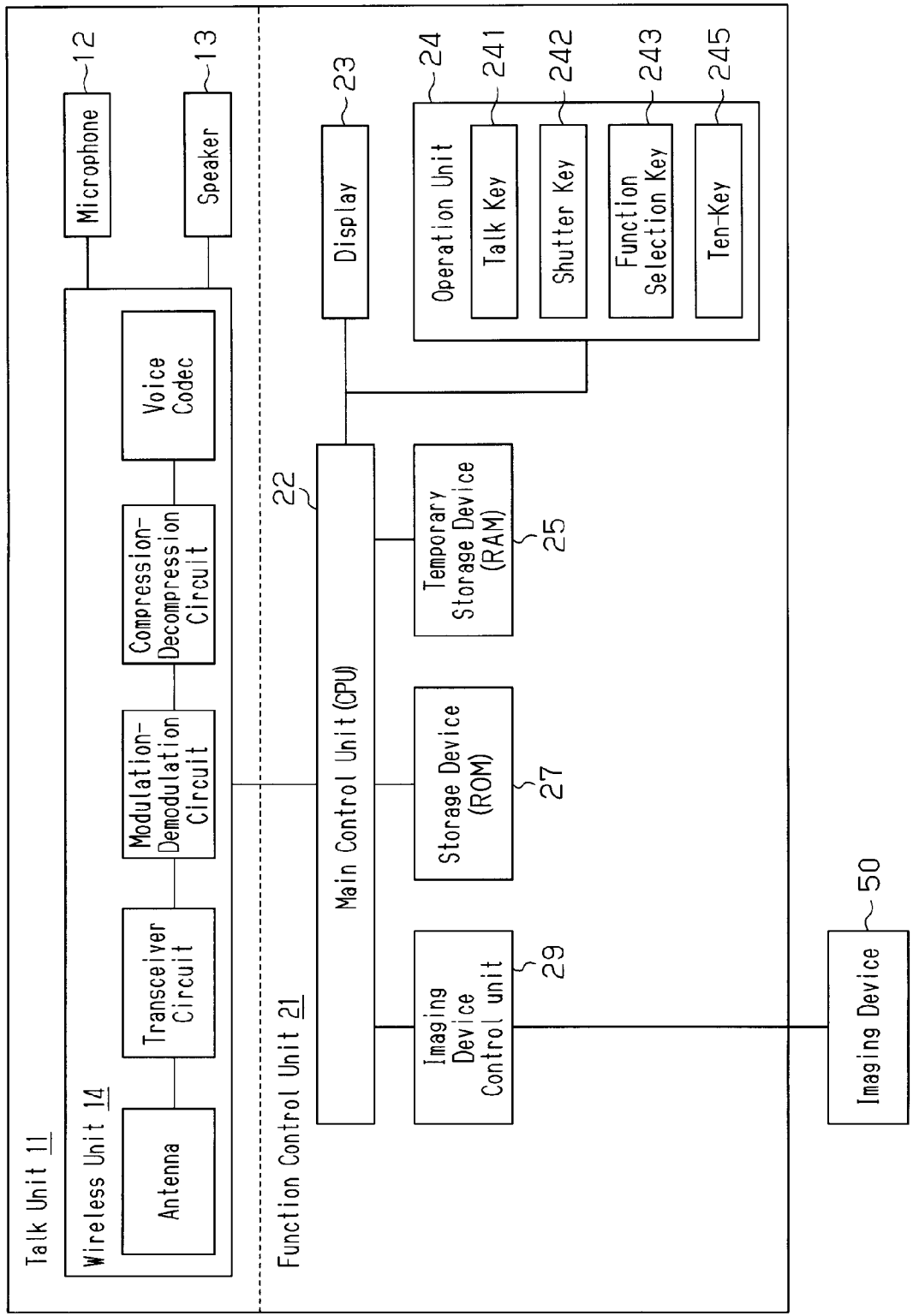
FIG. 3 is a block diagram showing the structure of the portable terminal.

FIG. 3 is block diagram showing the structure of the portable terminal. The portable terminal includes a talk unit 11, a function control unit 21, and the imaging device 50. The talk unit 11 includes a microphone 12, a speaker 13, and a wireless unit 14. The wireless unit 14 includes an antenna, a transceiver circuit, a modulation-demodulation circuit, a compression-decompression circuit, a voice codec, and the like. A voice input from the microphone 12 is transmitted as a voice signal from the wireless unit 14 of the caller's portable terminal and received by a recipient's portable terminal through a wireless unit 14 and output to the speaker 13.

In addition to indications and operations related to telephone conversations, the display 23 and the operation panel 24 are used for indications and operations related to data communication performed through the Internet. The operation panel 24 is used to input a telephone number when making a call and also used to input desired text, such as for electronic mail, when accessing the Internet for data communication services. The display 23 is formed by a liquid crystal display unit (LCD unit) and used to display images obtained through communication and images taken by the imaging device 50.

The operation panel 24 includes a talk key 241, a shutter key 242, a function selection key 243, and a ten-key pad 245. A telephone number is input by operating the ten-key pad 245 when making a telephone call, and the call is sent when the talk key 241 is operated. English letters, Japanese Katakana characters, and Japanese hiragana characters are allocated for the ten-key pad 245. Further, character code conversion can be performed by an English/numeral/kana conversion controller (not shown). Character code conversion generates an input text code corresponding to the activated key in accordance with whether the input mode is English/numeral/kana mode or kana/kanji conversion mode. The function selection key 243 activates predetermined functions of the portable terminal. The functions allocated to the keys differ depending on the manufacturer and model.

When the shutter key 242 is operated, an image is captured by the imaging device 50 via a main control unit 22 and an imaging device control unit 29. After the captured image is stored as image data in a temporary storage device 25 via the imaging device control unit 29 and the main control unit 22, the image may be displayed again on the display 23 via the main control unit 22, stored in external storage device (not shown), and transmitted to an external device via the wireless unit 14 when necessary.

Figure 4:
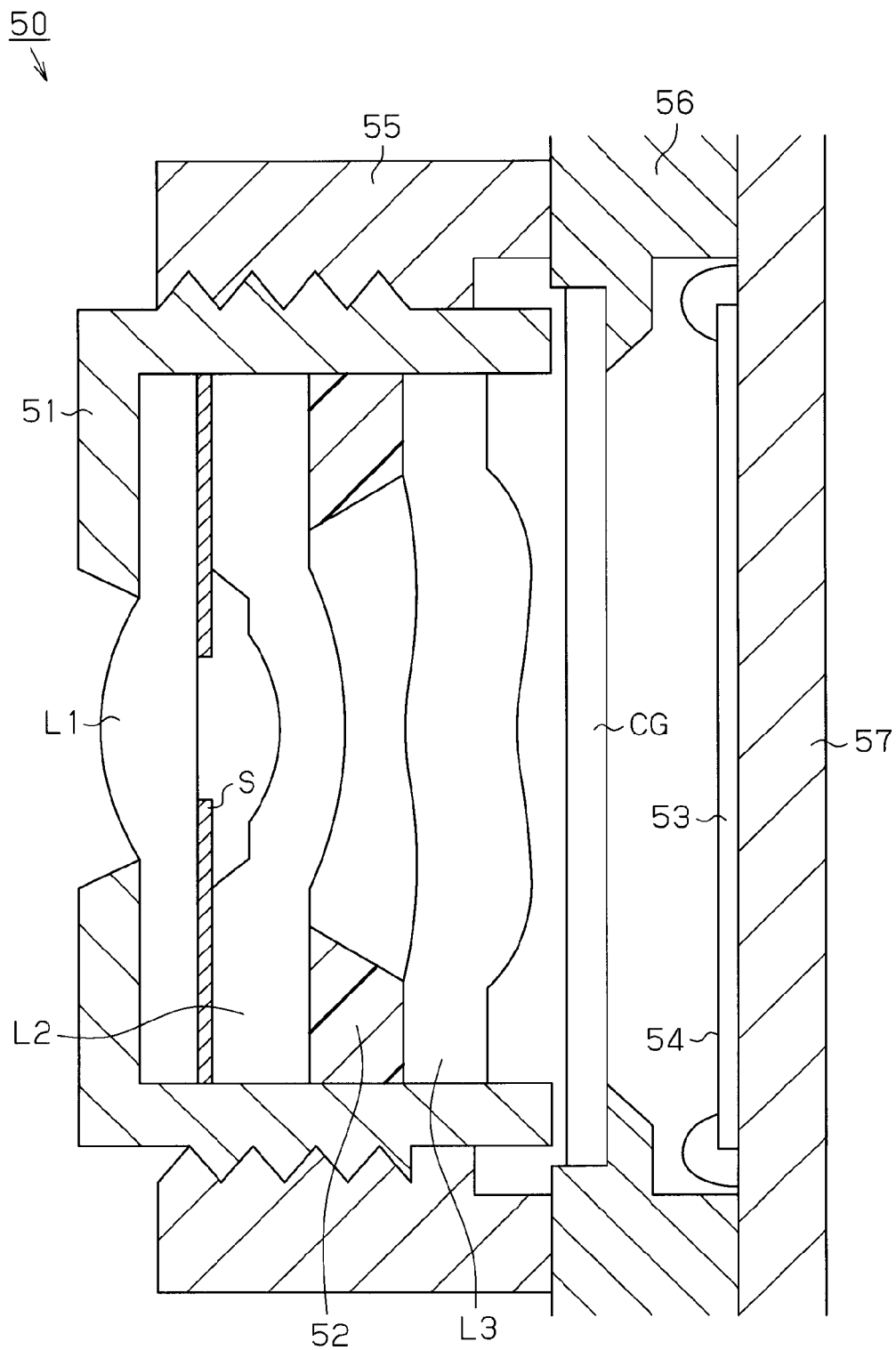
FIG. 4 is a schematic cross-sectional view of an imaging device according to a first embodiment of the present invention taken along a plane which includes the optical axis.

Referring to FIG. 4, the imaging device of the portable terminal includes an imaging element 53, such as a charged coupled device (CCD) sensor or a complementary metal-oxide semiconductor (CMOS) sensor. The imaging element 53 is fixed to a substrate 57. A cover glass CG is also fixed to the substrate 57 by means of a cylindrical first base 56. A cylindrical second base 55, which has a threaded inner surface so as to form a female screw, projects toward the object side from the first base 56. A lens barrel 51 includes a generally cylindrical end plate and a threaded outer surface so as to form a male screw corresponding to the female screw of the second base 55. The lens barrel 51 is mated with the second base 55 with the end plate facing toward the object side. A circular hole extends through the center of the bottom plate in the lens barrel 51.

The end plate of the lens barrel 51 has a flat inner surface. A first lens L1, which includes an optically effective diameter portion, is fixed to the flat inner surface of the lens barrel 51. The optically effective diameter portion of the first lens L1 is inserted into the hole in the end plate of the lens barrel 51. More specifically, in the first lens L1, the outer side of the optically effective diameter portion (hereinafter referred to as the "peripheral portion") is adhered to the inner flat surface of the base of the lens barrel 51 by a UV-curable resin or the like. An aperture stop S is adhered to the image side of the first lens L1 by UV-curable resin or the like. In the same manner, a second lens L2 and a third lens L3 are arranged toward the image side, with the second lens L2 being fixed to the aperture stop S, and the third lens L3 being adhered to the second lens L2 by means of a spacer 52. The distance between the lens barrel 51 and the imaging element 53 is adjustable in the imaging device. That is, by adjusting the mating amount of the lens barrel 51 with the second base 55, the distance between the lens barrel 51 and the imaging element 53 can be varied. Adjustment of the distance between the imaging element 53 and the imaging lens unit, which includes the first, second, and third lenses L1 to L3 in the lens barrel 51, enables focusing.

An image is formed by the imaging lens unit on an image forming surface 54, which is defined by a surface of the imaging element 53. The imaging element 53 converts such an image to digital data. Then, the digital data is sent to the main control unit 22 via the imaging device control unit 29 and processed as image data.

The imaging lens unit will now be described in detail with reference to FIGS. 5(a) and 5(b). FIGS. 5(a) and (b) only show the optically effective diameter portion of the lens to simplify description. The same applies to the subsequent drawings. From the object side toward the image side, the imaging lens unit includes the first lens L1, aperture stop S, second lens L2, third lens L3, and cover glass CG as described above. The first lens L1, the second lens L2, and the third lens L3 are aspherical lenses are plastic lenses injection molded from a resin material. As shown in FIG. 5(b), the first lens L1 has a convex object side surface. Further, the first lens L1 has an image side surface, which is concave near the optical axis and convex as the rim of the first lens L1 becomes closer. Hereinafter, the object side surface of each of the lenses L1, L2, and L3 is referred to as the "first surface," and the image side surface of each of the lens L1, L2, and L3 is referred to as the "second surface."

The width of a lens is obtained between the point located closest to the object and the point located closest to the image. A conventional first lens (indicated by the broken line in FIG.

5(b)) is shaped to be meniscus so that the first surface is convex toward the object side. Therefore, the conventional first lens has a width d1 obtained from the difference between the position of the apex on the first surface (convex surface), which is the closest point to the object, and the position of the end of the first lens on the second surface, which is the closest point to the image. Comparatively, in the first embodiment, the second surface of the first lens L1 is concave toward the image side near the optical axis and convex toward the image side as the rim of the first lens L1 becomes closer. Accordingly, the position of the lens end on the second surface of the first lens L1 is located more toward the object side in comparison with the conventional lens, and the apex of the convexity on the second surface is the point closest to the image side. As a result, the first lens L1 of the first embodiment has a width d2, which is less than the width d1 of the conventional first lens. This enables the stop S to be located closer to the object.

As shown in FIG. 5(a), the second lens L2 is shaped to be meniscus with the second surface thereof convex and facing toward the image side. The first surface of the third lens L3 is convex toward the object side near the optical axis and concave toward the object side as the rim of the third lens L3 becomes closer. The second surface of the third lens L3 is concave toward the image side near the optical axis and convex toward the image side as the third lens rim becomes closer. The first lens L1, second lens L2, and third lens L3 are aspherical lenses. Light transmitted through the first lens is corrected for aberration when passing through the second lens L2 and the third lens L3. The light transmitted through the third lens L3 passes through the cover glass CG and is focused on the image forming surface 54 to form an image.

The imaging lens unit of the first embodiment has the advantages described below.

(1) The second surface of the first lens L1 is formed to be concave on the image side near the optical axis and convex toward the image side as the rim of the first lens becomes closer. The width d2 of the first lens L1 in the first embodiment is thus less than the width d2 of the conventional first lens. This enables the stop S to be arranged closer to the object. Accordingly, if the distance between the point on the first lens located closest to the image and the image forming surface 54 (hereinafter referred to as the "total lens length") were to be the same as the conventional lens, the distance between the stop S and the image forming surface 54 would be longer than that of the conventional lens. This facilitates aberration correction and improves the optical performance Thus, an imaging lens unit having a lower profile is provided without adversely affecting optical performance.

(2) The first lens L1, second lens L2, and third lens L3 are all plastic lenses formed by injection molding resin material. This enables simple and inexpensive manufacturing of the lenses. Further, the weight of the entire lens unit can easily be reduced.

(3) The first lens L1, second lens L2, and third lens L3 are all aspherical lenses. This further facilitates aberration correction even when using three lenses. Thus, an imaging lens unit having a lower profile without adversely affecting optical performance.

(4) An imaging device with a lower profile can be provided by using the imaging lens unit that has a lower profile without adversely affecting the optical performance.

(5) A portable terminal with a lower profile can be provided by using the imaging device having a lower profile.

EXAMPLE 1

FIG. 6(a) is a cross-sectional view showing the imaging lens unit of the first embodiment taken along a plane including the optical axis. Numerical data of the optical components forming the imaging lens unit are shown below.
Field angle diagonal: 63.8° horizontal: 53.0° vertical: 41.0°)
Total focal length: 2.90 mm back focus: 1.08
Total lens length: 3.30 mm effective image height: Φ3.6 mm Table 1 shows lens data. In Table 1, surface number i (where i=1~8) is sequentially allocated from the object side to the image side, that is, from the first lens L1 to the cover glass CG, with the first surface of the first lens L1 being designated as i=1. For example, i=7, which is the surface number representing the seventh surface, corresponds to the second surface of the third lens L3, and i=3 represents the surface number of the stop S, which is considered to be a single surface. Further, $R_i$ represents the radius of curvature of each surface, $D_i$ represents the surface interval between the $i^{th}$ surface and the $i^{th}$+1 surface, nd represents the refractive index, and vd represents Abbe's number. Aspherical surfaces are indicated by appending the symbol * to the right side of the surface number.

TABLE 1

| Surface No. | Ri | Di | nd | vd |
|---|---|---|---|---|
| Object | ∞ | ∞ | | |
| 1' | 1.055224 | 0.516529 | 1.5331 | 56.14 |
| 2' | 8.929701 | 0.039660 | | |
| 3 (Stop) | ∞ | 0.393546 | | |
| 4' | −0.870774 | 0.360 | 1.6320 | 23.41 |
| 5' | −1.250476 | 0.343965 | | |
| 6' | 1.799470 | 0.566374 | 1.5331 | 56.14 |
| 7' | 1.454956 | 0.0750 | | |
| 8 | ∞ | 0.20 | 1.5231 | 58.57 |
| 9 | ∞ | 0.805 | | |
| Image | ∞ | — | | |

The aspherical surface shape is represented by the equation shown below.

$$z = \frac{(1/R)H^2}{1 + \sqrt{\{1 - (1+K)(H/R)^2\}}} + A4H^4 + A6H^6 + A8H^8 + A10H^{10} + A12H^{12} + A14H^{14} \tag{1}$$

In equation (1), the optical axis is the z axis, R represents the radius of curvature, H represents the height in a direction perpendicular to the optical axis, and K represents the Korenich constant. Further, A4, A6, A8, A10, A12, and A14 respectively represent the fourth order, sixth order, eighth order, tenth order, twelfth order, and fourteenth order aspherical surface coefficients.

The aspherical surface coefficient of each surface is as shown below in Table 2.

TABLE 2

| Ri | K | A4 | A6 | A8 | A10 | A12 | A14 |
|---|---|---|---|---|---|---|---|
| 1st Surface | 0 | −0.6262400e−1 | −0.5787800e−1 | 0.1928440e+0 | −0.1506162e+1 | 0 | 0 |

TABLE 2-continued

| Ri | K | A4 | A6 | A8 | A10 | A12 | A14 |
|---|---|---|---|---|---|---|---|
| 2nd Surface | 0 | −0.2044180e+0 | 0.1169590e+0 | −0.2992387e+1 | 0.5093720e+1 | 0 | 0 |
| 4th Surface | 0 | −0.4243650e+0 | 0.1634027e+1 | −0.2984321e+1 | 0.1334830e+2 | −0.2371887e+2 | 0 |
| 5th Surface | 0 | −0.5120890e+0 | 0.2067855e+1 | −0.2998578e+1 | 0.6272130e+1 | −0.4812749e+1 | 0 |
| 6th Surface | 0 | −0.8074920e+0 | 0.7637750e+0 | −0.2851530e+0 | −0.1206400e+0 | 0.1512910e+0 | −0.379810e−1 |
| 7th Surface | 0 | −0.5947630e+0 | 0.4317650e+0 | −0.2692960e+0 | 0.8643800e−1 | −0.9195732e−2 | −0.2005911e−2 |

COMPARATIVE EXAMPLE 1

FIG. 6(b) is a cross-sectional view of a conventional imaging lens unit taken along a plane including the optical axis. Numerical data of the optical components forming the imaging lens unit is shown below.

Field angle diagonal: 60.4° horizontal: 50.0° perpendicular: 38.4°

Total focal length: 3.08 mm back focus: 1.01

Total lens length: 3.30 mm effective image height: Φ3.6 mm

Table 3 shows lens data. In Table 3, surface number i is allocated in the same manner as in Table 1. Further, Ri, Di, nd, and vd are the same parameters as those of Table 1.

TABLE 3

| Surface No. | Ri | Di | nd | vd |
|---|---|---|---|---|
| Object | ∞ | ∞ | | |
| 1' | 0.861288 | 0.608896 | 1.5331 | 56.14 |
| 2' | 1.915270 | 0.086689 | | |
| 3 (Stop) | ∞ | 0.431137 | | |
| 4' | −1.020534 | 0.360 | 1.6320 | 23.41 |
| 5' | −1.603461 | 0.2520 | | |
| 6' | 1.841621 | 0.547768 | 1.5331 | 56.14 |
| 7' | 1.844411 | 0.073883 | | |
| 8 | ∞ | 0.20 | 1.5231 | 58.57 |
| 9 | ∞ | 0.740 | | |
| Image | ∞ | — | | |

The aspherical surface shape is derived using equation (1) in the same manner as in example 1. The aspherical surface coefficient of each surface is as described below.

TABLE 4

| Ri | K | A4 | A6 | A8 | A10 | A12 | A14 |
|---|---|---|---|---|---|---|---|
| 1st Surface | 0 | −0.420030e−1 | 0.359527e+0 | −0.927730e+0 | 0.111389e+1 | 0 | 0 |
| 2nd Surface | 0 | 0.187046e+0 | −0.108310e+1 | 0.627385e+1 | −0.115550e+2 | 0 | 0 |
| 4th Surface | 0 | −0.333946e+0 | −0.238908e+1 | 0.460199e+1 | −0.258475e+0 | −0.426756e+2 | 0 |
| 5th Surface | 0 | −0.653898e+0 | 0.915530e+0 | −0.127418e+1 | 0.141207e+1 | 0.206431e+0 | 0 |
| 6th Surface | 0 | −0.860537e+0 | 0.808721e+0 | −0.368241e+0 | 0.890010e−1 | −0.110120e−1 | 0.614736e−3 |
| 7th Surface | 0 | −0.477498e+0 | 0.300959e+0 | −0.160848e+0 | 0.559300e−1 | −0.123270e−1 | 0.176950e−2 |

COMPARISON OF EXAMPLE 1 AND COMPARATIVE EXAMPLE 1

As shown in FIGS. 6(a) and 6(b), when comparing the imaging lens unit of example 1 (FIG. 6(a)) and the imaging lens unit of comparative example 1 (FIG. 6(b)), the total lens length is the same between the two and 3.30 mm. However, the stop S in the imaging lens unit of example 1 is located closer to the object. As a result, the distance from the stop S to the image forming surface 54 is longer.

The aberration of the imaging lens unit in example 1 (FIG. 7(a)) and the aberration of the imaging lens unit in comparative example 1 (FIG. 7(b)) will now be compared. Point dispersion at each image formation position is less in example 1. Thus, it can be understood that various aberrations are more suppressed in example 1. Furthermore, dispersion caused by the light wavelength is less, and the longitudinal chromatic aberration and magnification chromatic aberration is more suppressed in example 1.

The curvature of field and distortion of the imaging lens unit in example 1 (FIG. 8(a)) and the imaging lens unit in comparative example 1 (FIG. 8(b)) will now be compared. Although the curvature of field is difficult to determine because of the differing graph shapes, in example 1, there is less fluctuation in distortion even when distanced from the optical axis. It is thus apparent that distortion is suppressed in example 1.

The spherical aberration of the imaging lens unit of example 1 (FIG. 9(a)) and the imaging lens unit of comparative example 1 (FIG. 9(b)) will now be compared. Regardless of the wavelength, example 1 has less fluctuation in aberration. It is thus apparent that spherical aberration is suppressed in example 1.

Figure 11:
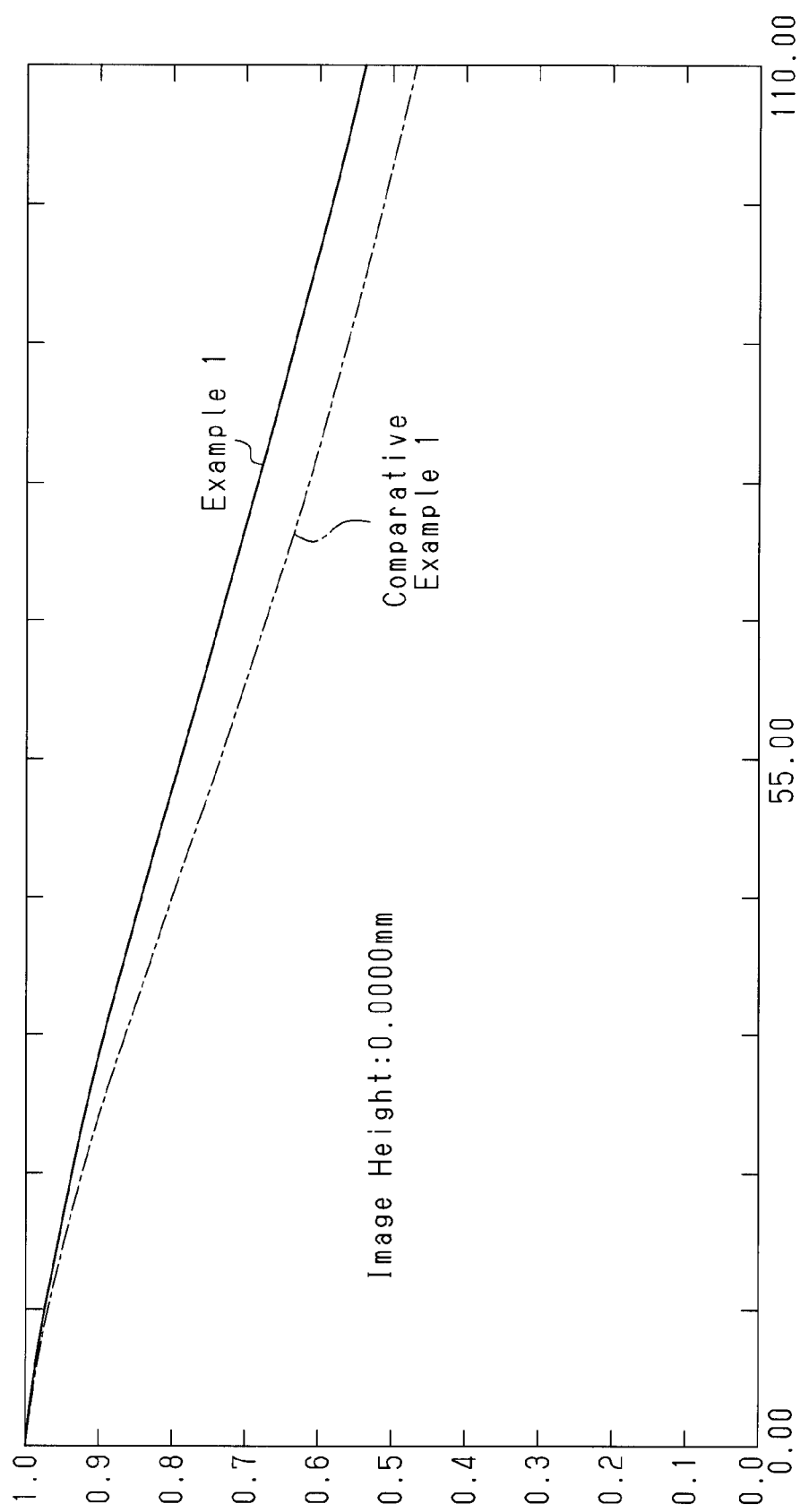
FIG. 11 is a graph of the transfer function at an image height position of 0.000 mm in example 1 and comparative example 1.
Figure 12:
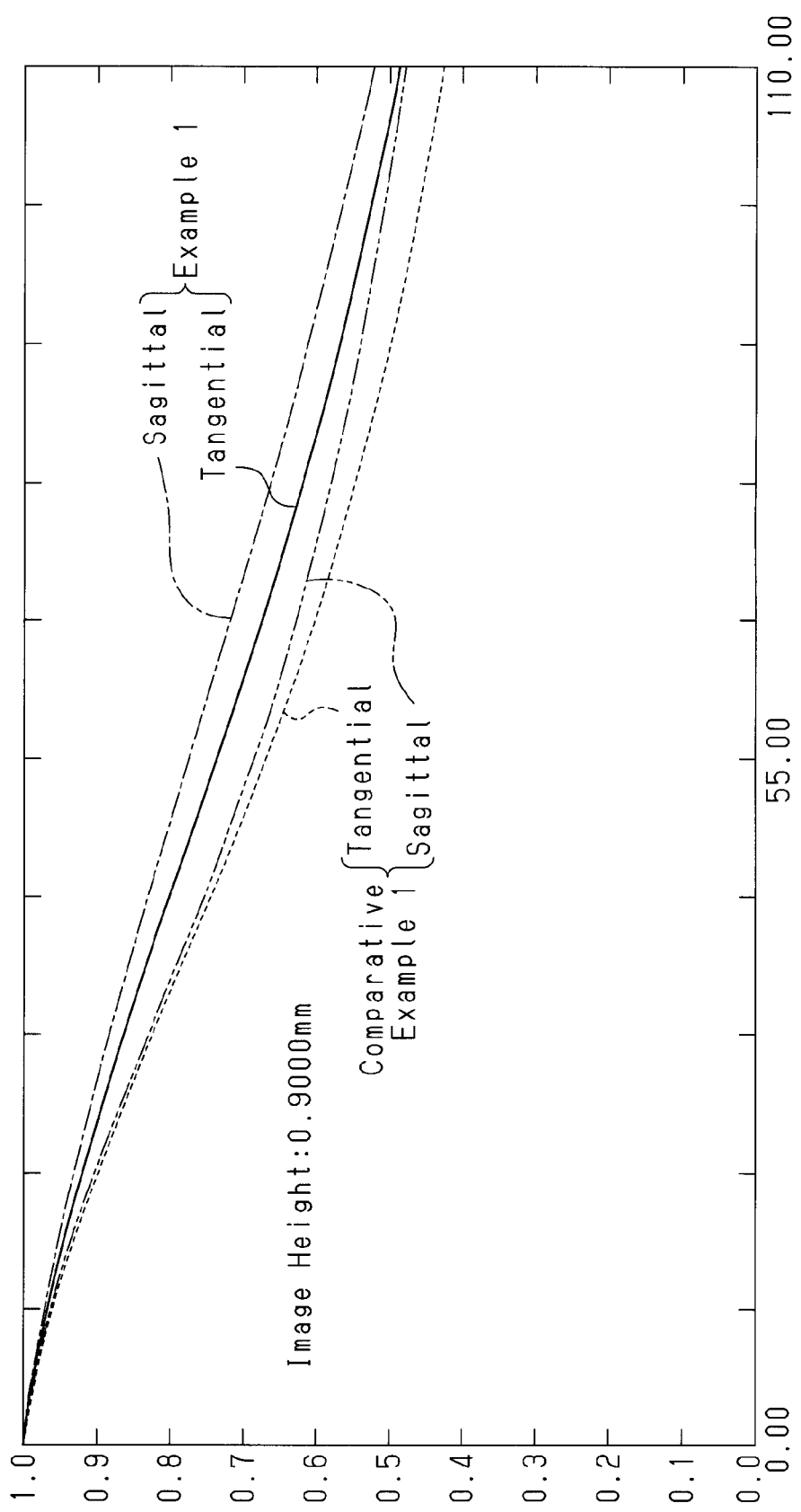
FIG. 12 is a graph of the transfer function at an image height position of 0.900 mm in example 1 and comparative example 1.
Figure 13:
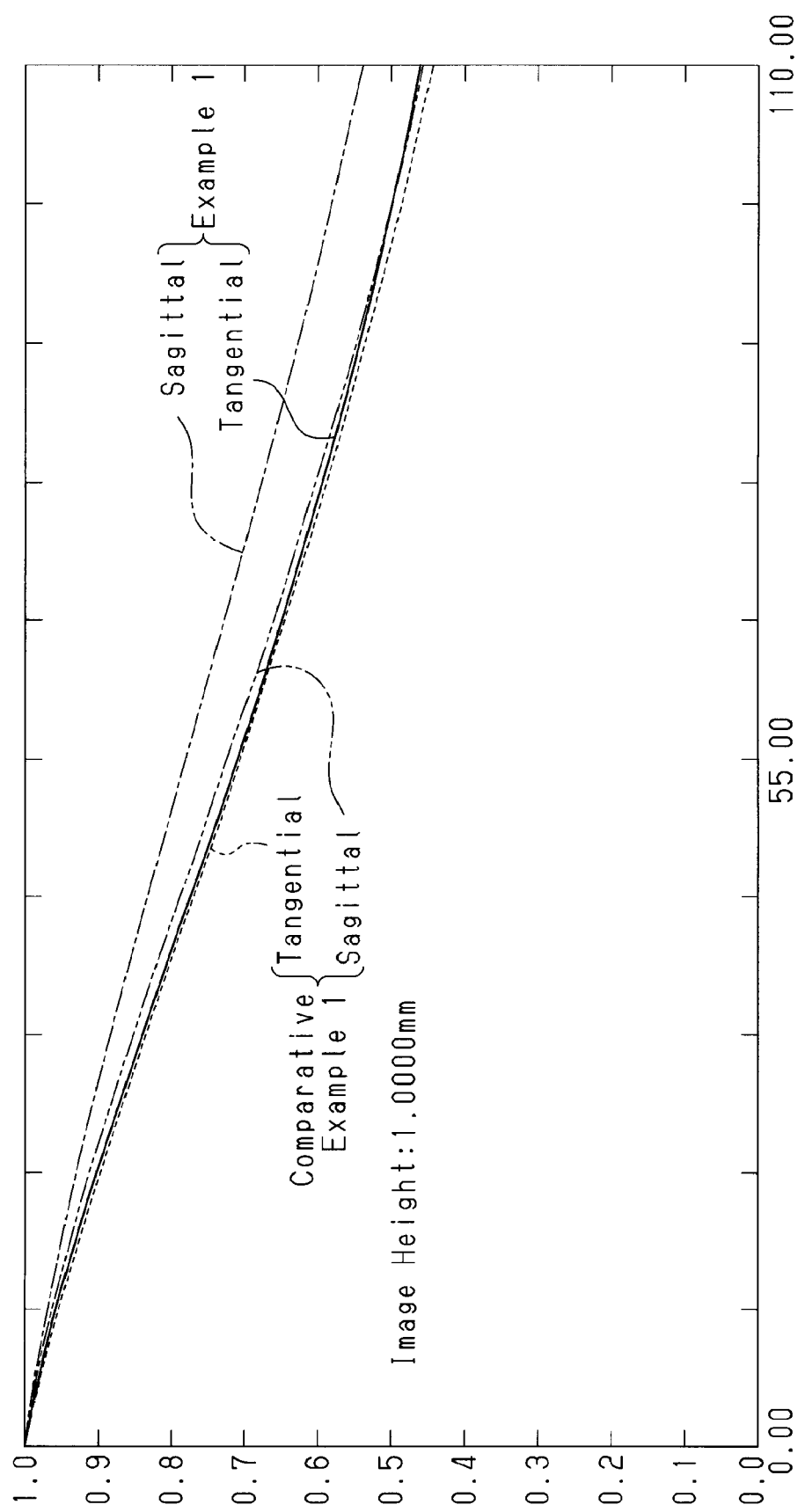
FIG. 13 is a graph of the transfer function at an image height position of 1.000 mm in example 1 and comparative example 1.
Figure 14:
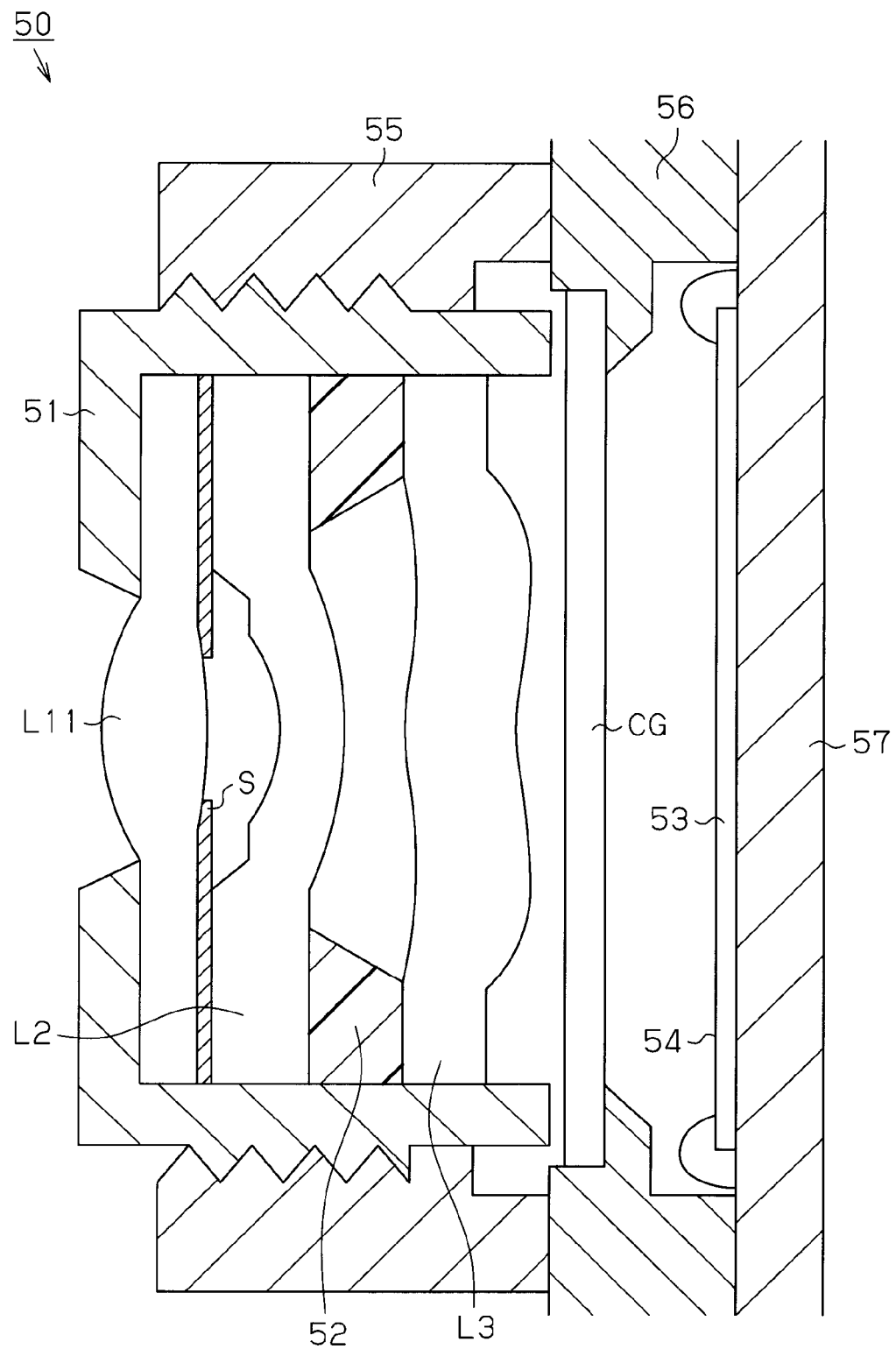
FIG. 14 is a schematic cross-sectional view of an imaging device according to a second embodiment of the present invention taken along a plane which includes the optical axis.

The transfer function (MTF) of the imaging lens unit of example 1 (FIG. 10(a)) and the imaging lens unit of comparative example 1 (FIG. 10(b)) will now be compared. FIGS. 11 through 13 are graphs comparing the transfer functions (MTF) of example 1 and comparative example 1 at three image height positions on the image forming surface. At each position on the image forming surface and in the tangential and sagittal directions, in the graph of example 1, the transfer function value in generally all of the regions of spatial frequency is higher than that of comparative example 1. It is thus apparent that the image forming performance of the imaging lens unit of example 1 is higher than that of comparative example 1.

An imaging lens unit according to a second embodiment of the present invention will now be discussed with reference to FIGS. 14 through 23. The second embodiment differs from the first embodiment in the shape of the first lens. Otherwise, the structure of the second embodiment is the same as the first embodiment.

As shown in FIGS. 15(*a*) and 15(*b*), the second surface of the first lens L11 is convex toward the image side near the optical axis. Accordingly, the lens end on the second surface of the first lens L11 is located more toward the object side than the conventional lens (indicated by the broken lines in FIG. 15(*b*)), and the apex of the second surface (convex surface) is the point closest to the image. As a result, in the same manner as in the first embodiment, the width d22 of the first lens in the second embodiment is less than the width d1 of the conventional first lens. Further, the stop S may be located closer to the object.

In addition to advantages (1) to (5) of the first embodiment, the imaging lens unit of the second embodiment has advantage (6), as described below.

(6) The first surface of the first lens L11 is formed to be convex toward the object side, and the second surface is convex toward the image side. The width d22 of the first lens L21 of the second embodiment is thus less than the width d1 of the conventional first lens. This enables the stop S to be arranged closer to the object. Accordingly, if the distance between the point on the first lens closest to the image and the image forming surface 54 (total lens length) were to be the same as the conventional lens, the distance from the stop S to the image forming surface 54 would be longer than that of the conventional lens. This facilitates aberration correction and improves the optical performance. Thus, an imaging lens unit having a lower profile is provided without adversely affecting optical performance.

EXAMPLE 2

FIG. 16(*a*) is a cross-sectional view of the imaging lens unit in the second embodiment taken along a plane including the optical axis. Numerical data of the optical components forming the imaging lens unit is shown below.

Field angle diagonal: 63.8° horizontal: 53.0° perpendicular: 41.0°
Total focal length: 2.90 mm back focus: 1.08
Total lens length: 3.30 mm effective image height: Φ3.6 mm Table 5 shows lens data. In Table 5, surface number i is allocated in the same manner as in Table 1. Further, Ri, Di, nd, and vd are parameters similar to those of Table 1.

TABLE 5

| Surface No. | Ri | Di | nd | vd |
|---|---|---|---|---|
| Object | ∞ | ∞ | | |
| 1' | 1.143227 | 0.508946 | 1.5331 | 56.14 |
| 2' | −46.253222 | 0.015343 | | |
| 3 (Stop) | ∞ | 0.369850 | | |
| 4' | −0.781481 | 0.360 | 1.6320 | 23.41 |
| 5' | −1.008089 | 0.481411 | | |
| 6' | 2.450892 | 0.475498 | 1.5331 | 56.14 |
| 7' | 1.457171 | 0.080 | | |
| 8 | ∞ | 0.20 | 1.5231 | 58.57 |
| 9 | ∞ | 0.8090 | | |
| Image | ∞ | — | | |

The aspherical surface shape is derived using equation (1) in the same manner as in example 1. The aspherical surface coefficient of each surface is shown below.

TABLE 6

| Ri | K | A4 | A6 | A8 | A10 | A12 | A14 |
|---|---|---|---|---|---|---|---|
| 1st Surface | 0 | −0.849720e−1 | −0.1483580e+0 | 0.2786690e+0 | −0.1945024e+1 | 0 | 0 |
| 2nd Surface | 0 | −0.303765e+0 | 0.3143920e+0 | −0.3431352e+1 | 0.5567856e+1 | 0 | 0 |
| 4th Surface | 0 | −0.180714e+0 | 0.3396706e+1 | −0.1160439e+2 | 0.3870706e+2 | −0.5135452e+2 | 0 |
| 5th Surface | 0 | −0.491740e−1 | 0.18159670e+1 | −0.2743601e+1 | 0.6437166e+1 | −0.5438228e+1 | 0 |
| 6th Surface | 0 | −0.561029e+0 | 0.5358520e+0 | −0.2298080e+0 | −0.1111810e+0 | 0.1493820e+0 | −0.3803600e−1 |
| 7th Surface | 0 | −0.599920e+0 | 0.4999150e+0 | −0.3595460e+0 | 0.1432300e+0 | −0.2977700e−1 | 0.1354667e−2 |

COMPARISON OF EXAMPLE 2 AND COMPARATIVE EXAMPLE 1

The imaging lens unit of the second embodiment will now be compared with the imaging lens unit of comparative example 1 (refer to Tables 3 and 4), which was used for comparison with example 1. As shown in FIGS. 16(*a*) and 16(*b*), when comparing the imaging lens unit of example 2 (FIG. 16(*a*)) and the imaging lens unit of comparative example 1 (FIG. 16(*b*)), the total lens length is the same between the two and 3.30 mm. However, the stop S in the imaging lens unit of example 2 is located closer to the object. Thus, the distance from the stop S to the image forming surface 54 is longer.

The aberration of the imaging lens unit of example 2 (FIG. 17(*a*)) and the aberration of the imaging lens unit of comparative example 1 (FIG. 17(*b*)) will now be compared. Point dispersion at each image formation position is less in example 2, and various aberrations are deemed better suppressed. Thus, it can be understood that various aberrations are more suppressed in example 1. Furthermore, dispersion caused by the light wavelength is less, and the longitudinal chromatic aberration and magnification chromatic aberration is more suppressed in example 2.

The curvature of field and distortion of the imaging lens unit of example 2 (FIG. 18(*a*)) and the imaging lens unit of comparative example 1 (FIG. 18(*b*)) will now be compared. Although the curvature of field is difficult to determine because of the differing graph shapes, in example 1, there is less fluctuation in distortion even when distanced from the optical axis. It is thus apparent that distortion is suppressed in example 2.

The spherical aberration of the imaging lens unit of example 2 (FIG. 19(a)) and the imaging lens unit of comparative example 1 (FIG. 19(b)) will now be compared. Regardless of the wavelength, example 2 has less fluctuation in aberration. It is thus apparent that spherical aberration is suppressed in example 2.

Figure 21:
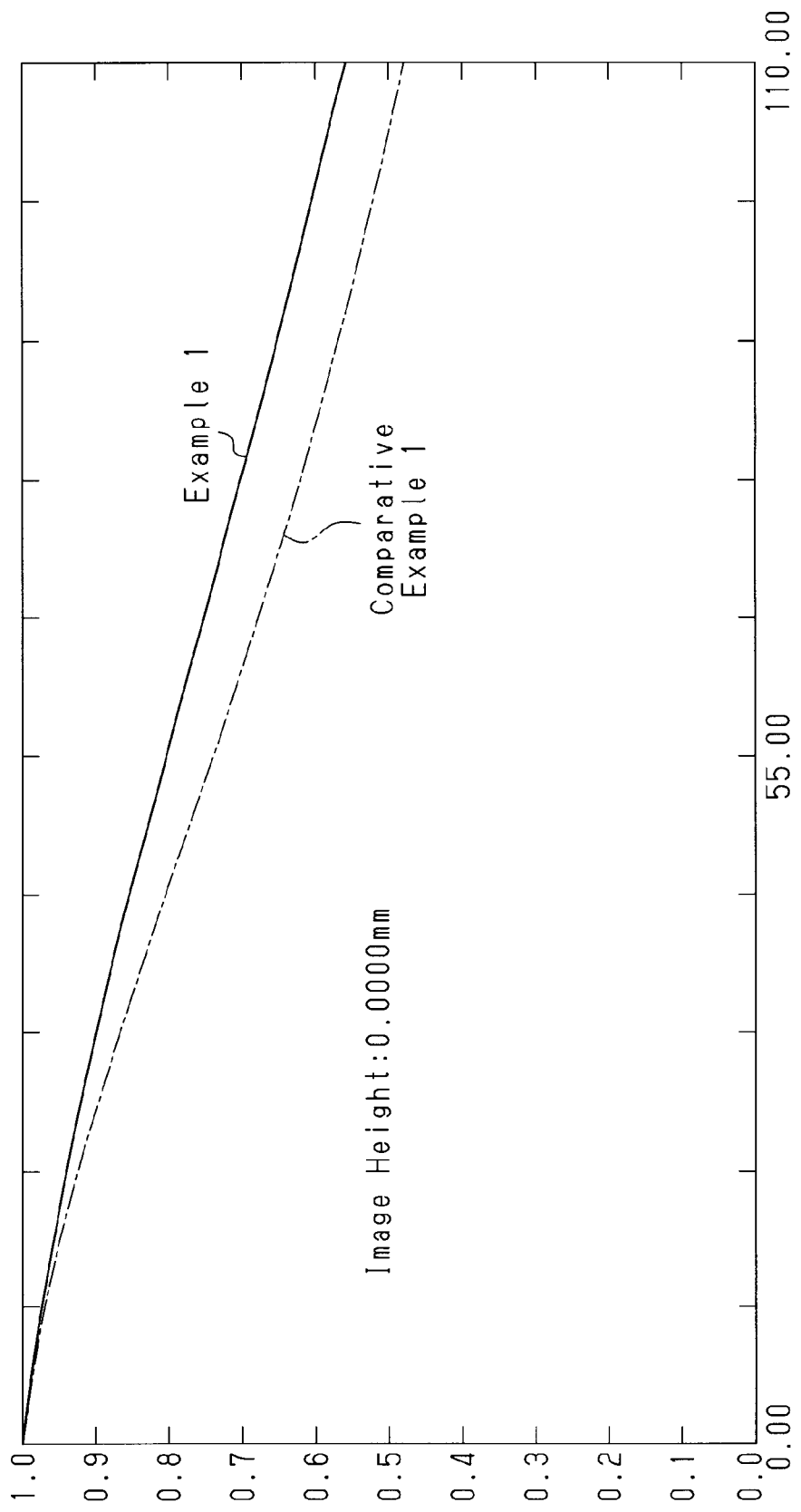
FIG. 21 is a graph of the transfer function at an image height position of 0.000 mm in example 2 and comparative example 1.
Figure 22:
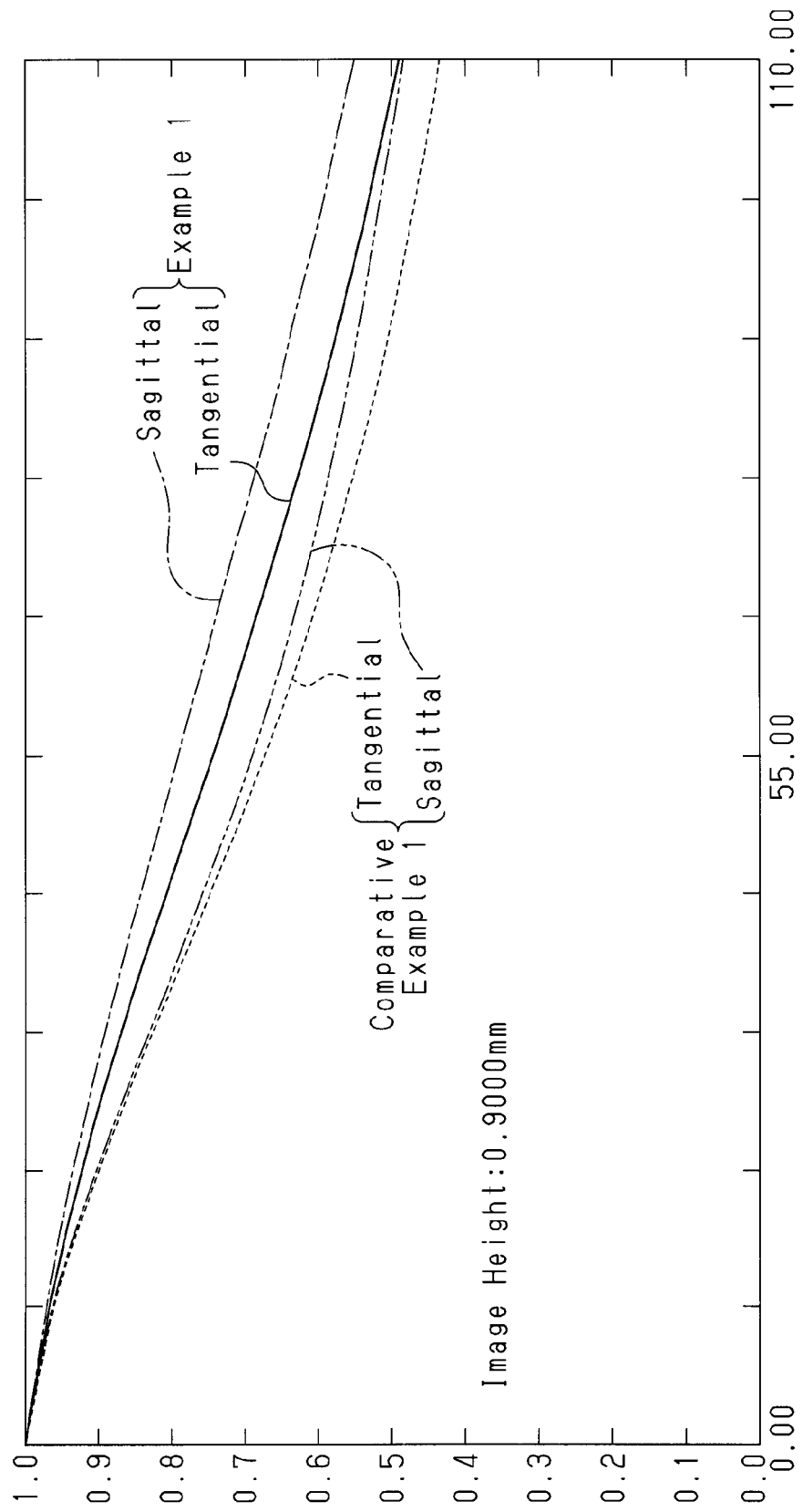
FIG. 22 is a graph of the transfer function at an image height position of 0.900 mm in example 2 and comparative example 1.
Figure 23:
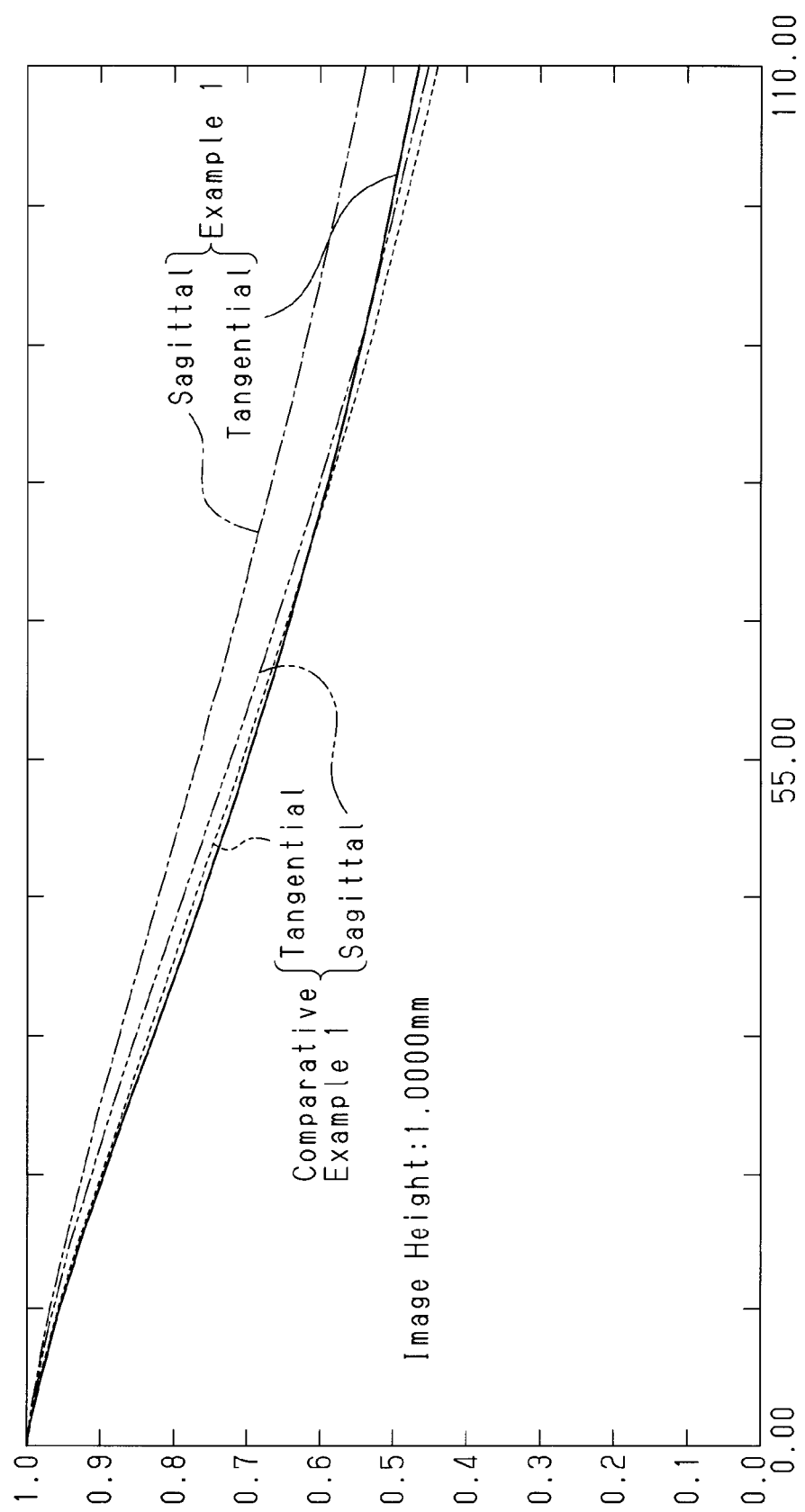
FIG. 23 is a graph of the transfer function at an image height position of 1.000 mm in example 2 and comparative example 1.

The transfer function (MTF) of the imaging lens unit of example 2 (FIG. 20(a)) and the imaging lens unit of comparative example 1 (FIG. 20(b)) will now be compared. FIGS. 21 through 23 are graphs comparing the transfer functions (MTF) of example 2 and comparative example 1 at three image height positions on the image forming surface. At each position on the image forming surface and in the tangential and sagittal directions, in the graph of example 2, the transfer function value in generally all of the regions of spatial frequency is higher than that of comparative example 1. It is thus apparent that the image forming performance of the imaging lens unit of example 2 is higher than that of comparative example 1.

It should be apparent to those skilled in the art that the present invention may be embodied in many other specific forms without departing from the spirit or scope of the invention. Particularly, it should be understood that the present invention may be embodied in the following forms.

Although the first lens L1, second lens L2, and third lens L3 are all aspherical lenses in the above-described embodiments, the lenses do not need not to be all aspherical as long as equivalent optical characteristics can be maintained. Costs can be reduced by using some spherical lenses, which are easy to manufacture.

Although the first lens L1, second lens L2, and third lens L3 are all plastic lenses formed from a resin material in the above-described embodiments, the lenses do not necessarily have to be formed from a resin material. For example, glass mold aspherical lenses may also be used as long as equivalent optical characteristics can be maintained.

The cover glass CG is arranged between the third lens L3 and the image forming surface 54 in the above-described embodiments. However, the cover glass CG does not necessarily have to be used. For example, a filter for shielding out infrared radiation may be used in lieu of or in addition to the cover glass CG.

The imaging device 50 is of a digital type that uses the imaging element 53 formed by a CCD sensor or CMOS sensor in the above-described embodiments. However, the imaging device 50 may be of a silver salt photography type imaging device which uses optical film as the imaging element 53.

Although the imaging device 50 is used in a portable terminal in the above-described embodiments, the imaging device 50 may also be used in a normal camera or a personal computer. In addition to producing still images, the imaging device 50 may be used to produce moving images.

The present examples and embodiments are to be considered as illustrative and not restrictive, and the invention is not to be limited to the details given herein, but may be modified within the scope and equivalence of the appended claims.

What is claimed is:

1. An imaging lens unit comprising:
a first lens, an aperture stop, a second lens, and a third lens arranged sequentially along an optical axis from an object side toward an image side;
the first lens including:
a first surface located on the object side and being convex toward the object side; and
a second surface located on the image side and being concave toward the image side near the optical axis and convex toward the image side as the first lens rim becomes closer, wherein an apex of the convexity on the second surface resides within an effective diameter of the second surface;
the second lens being meniscus in shape and including:
a first surface located on the object side; and
a second surface located on the image side and being convex toward the image side; and
the third lens including:
a first surface located on the object side and being convex toward the object side near the optical axis and concave toward the object side as the third lens rim becomes closer; and
a second surface located on the image side and being concave toward the image side near the optical axis and convex toward the image side as the third lens rim becomes closer.

2. The imaging lens unit according to claim 1, wherein at least the first lens is formed from a resin material.

3. The imaging lens unit according to claim 1, wherein the first surface and the second surface of at least the first lens are each aspherical in shape.

4. An imaging device comprising:
an imaging lens unit including a first lens, an aperture stop, a second lens, and a third lens arranged sequentially along an optical axis from an object side toward an image side;
and an imaging element which converts an optical image formed by the imaging lens unit to an electrical signal;
the first lens including:
a first surface located on the object side and being convex toward the object side;
and a second surface located on the image side and being concave toward the image side near the optical axis and convex toward the image side as the first lens rim becomes closer, wherein an apex of the convexity on the second surface resides within an effective diameter of the second surface;
the second lens being meniscus in shape and including:
a first surface located on the object side;
and a second surface located on the image side and being convex toward the image side;
and the third lens including:
a first surface located on the object side and being convex toward the object side near the optical axis and concave toward the object side as the third lens rim becomes closer;
and a second surface located on the image side and being concave toward the image side near the optical axis and convex toward the image side as the third lens rim becomes closer.

5. A portable terminal comprising:
an imaging device including:
an imaging lens unit including a first lens, an aperture stop, a second lens, and a third lens arranged sequentially along an optical axis from an object side toward an image side;
and an imaging element which converts an optical image formed by the imaging lens unit to an electrical signal;
the first lens including:
a first surface located on the object side and being convex toward the object side;
and a second surface located on the image side and being concave toward the image side near the optical axis and convex toward the image side as the first lens rim becomes closer, wherein an apex of the convexity on the second surface resides within an effective diameter of the second surface;

the second lens being meniscus in shape and including:
- a first surface located on the object side; and
- a second surface located on the image side and being convex toward the image side;

and the third lens including:
- a first surface located on the object side and being convex toward the object side near the optical axis and concave toward the object side as the third lens rim becomes closer; and
- a second surface located on the image side and being concave toward the image side near the optical axis and convex toward the image side as the third lens rim becomes closer.

* * * * *

UNITED STATES PATENT AND TRADEMARK OFFICE
CERTIFICATE OF CORRECTION

PATENT NO. : 7,916,405 B2
APPLICATION NO. : 12/181716
DATED : March 29, 2011
INVENTOR(S) : Yuma Aoi and Youhei Nakagawa It is certified that error appears in the above-identified patent and that said Letters Patent is hereby corrected as shown below:

Please change the assignee address on page 1, item (75) from Hirakata (JP) to read:

Neyagawa (JP)

Signed and Sealed this
Thirty-first Day of May, 2011

David J. Kappos
*Director of the United States Patent and Trademark Office*